(12) United States Patent
Imai et al.

(10) Patent No.: US 12,523,910 B2
(45) Date of Patent: Jan. 13, 2026

(54) LIQUID CRYSTAL PANEL AND DISPLAY DEVICE

(71) Applicant: Sharp Display Technology Corporation, Kameyama (JP)

(72) Inventors: Masahiro Imai, Kameyama (JP); Yasuyoshi Kaise, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/632,789

(22) Filed: Apr. 11, 2024

(65) Prior Publication Data
US 2025/0004336 A1  Jan. 2, 2025

(30) Foreign Application Priority Data
Jun. 27, 2023  (JP) ................. 2023-105387

(51) Int. Cl.
*G02F 1/1362* (2006.01)
*G02F 1/1333* (2006.01)
*G02F 1/1343* (2006.01)

(52) U.S. Cl.
CPC .. *G02F 1/136286* (2013.01); *G02F 1/133308* (2013.01); *G02F 1/134309* (2013.01)

(58) Field of Classification Search
CPC ......... G02F 1/136286; G02F 1/133308; G02F 1/134309
See application file for complete search history.

(56) References Cited

U.S. PATENT DOCUMENTS

| | | | |
|---|---|---|---|
| 2003/0038912 A1* | 2/2003 | Broer | C09K 19/38 349/122 |
| 2010/0295841 A1 | 11/2010 | Matsuda et al. | |
| 2016/0283028 A1 | 9/2016 | Yamazaki et al. | |
| 2016/0358986 A1 | 12/2016 | Yamazaki et al. | |
| 2020/0091196 A1* | 3/2020 | Matsuura | G02F 1/136277 |
| 2020/0111850 A1 | 4/2020 | Yamazaki et al. | |

FOREIGN PATENT DOCUMENTS

| | | |
|---|---|---|
| JP | 5036864 B2 | 9/2012 |
| JP | 5468766 B2 | 4/2014 |
| JP | 6700079 B2 | 5/2020 |
| JP | 2022-014177 A | 1/2022 |
| JP | 2022-031991 A | 2/2022 |

* cited by examiner

*Primary Examiner* — Lucy P Chien
(74) *Attorney, Agent, or Firm* — ScienBiziP, P.C.

(57) ABSTRACT

A liquid crystal panel includes a first substrate, a second substrate, and a liquid crystal layer, and includes an active region and a frame region. The first substrate includes multiple pixel electrodes and multiple signal wiring lines. The liquid crystal panel further includes multiple pixel drive circuits located outside the active region. The pixel electrodes and portions of the signal wiring lines located in the active region are made of a transparent conductive material. The active region includes a display region defined by at least some of the multiple pixels. The pixel electrodes located in the display region include at least one pixel electrode set including two or more pixel electrodes electrically connected to each other.

19 Claims, 26 Drawing Sheets

LIQUID CRYSTAL PANEL AND DISPLAY DEVICE

CROSS-REFERENCE TO RELATED APPLICATIONS

This application claims the benefit of priority to Japanese Patent Application Number 2023-105387 filed on Jun. 27, 2023. The entire contents of the above-identified application are hereby incorporated by reference.

BACKGROUND

Technical Field

The disclosure relates to a liquid crystal panel. The disclosure also relates to a display device including a liquid crystal panel.

As a display device, a layered display device having a configuration in which two electro-optical panels are layered is known. An example of the layered display device is disclosed in JP 2022-31991 A.

The display device disclosed in JP 2022-31991 A includes a first display panel and a second display panel that has light-transmitting properties and is located on a viewer's side with respect to the first display panel. In the display device disclosed in JP 2022-31991 A, an image displayed on a display surface of the first display panel can be viewed through the second display panel. JP 2022-31991 A discloses a liquid crystal display panel and an organic EL display panel as specific examples of the first display panel. A typical example of the second display panel having light-transmitting properties is a liquid crystal display panel.

SUMMARY

In a layered display device, when display by a panel located on a back face side is viewed through a panel located on a viewer's side, from the viewpoint of achieving a bright display and/or reducing power consumption, the panel on the viewer's side preferably will have high transmittance.

Embodiments of the disclosure have been made in view of the above-mentioned issues. A purpose of the disclosure is to provide liquid crystal panels that can achieve higher transmittance than known liquid crystal panels and are suitably used as an electro-optical panel located on a viewer's side in a layered display device.

The present specification discloses liquid crystal panels and display devices described in the following items.

Item 1

A liquid crystal panel including a first substrate, a second substrate facing the first substrate, and a liquid crystal layer located between the first substrate and the second substrate, in which the liquid crystal panel includes an active region including multiple pixels arranged in a matrix and a frame region located around the active matrix region, the first substrate includes multiple pixel electrodes, each of the multiple pixel electrodes being located in each of the multiple pixels, and multiple signal wiring lines, each of the multiple signal wiring lines extending from the frame region to the active region, the liquid crystal panel further includes multiple pixel drive circuits located outside the active region, the multiple pixel electrodes and portions of the multiple signal wiring lines located in the active region are made of a transparent conductive material, the active region includes a display region defined by at least some of the multiple pixels, and of the multiple pixel electrodes, pixel electrodes located in the display region include at least one pixel electrode set including two or more pixel electrodes electrically connected to each other.

Item 2

The liquid crystal panel according to item 1, in which the active region includes a further display region defined by a first group of pixels among the multiple pixels, the display region is defined by a second group of pixels among the multiple pixels, and in a case in which the further display region is referred to as a first display region and the display region is referred to as a second display region, pixel electrodes located in the first display region among the multiple pixel electrodes are electrically independent on a pixel-by-pixel basis.

Item 3

The liquid crystal panel according to item 1 or 2, in which the multiple pixel electrodes have substantially the same shape.

Item 4

The liquid crystal panel according to any one of items 1 to 3, in which the first substrate includes a first conductive layer including the multiple pixel electrodes, a second conductive layer including the portions of the multiple signal wiring lines located in the active region, and a first insulating layer provided between the first conductive layer and the second conductive layer.

Item 5

The liquid crystal panel according to item 4, in which a certain pixel electrode set of the at least one pixel electrode set includes two or more pixel electrodes connected to a certain signal wiring line of the multiple signal wiring lines in contact holes independently formed in the first insulating layer.

Item 6

The liquid crystal panel according to item 4 or 5, in which the first substrate further includes a first connection electrode configured to overlap two or more pixel electrodes adjacent to each other as viewed from a normal direction of a substrate plane of the first substrate, and a certain pixel electrode set of the at least one pixel electrode set includes two or more pixel electrodes electrically connected to each other via the first connection electrode.

Item 7

The liquid crystal panel according to item 6, in which the first connection electrode is included in the second conductive layer, and the two or more pixel electrodes electrically connected to each other via the first connection electrode are connected to the first connection electrode in contact holes independently formed in the first insulating layer.

Item 8

The liquid crystal panel according to item 6 or 7, in which the first connection electrode overlaps four pixel electrodes arranged in two rows and two columns as viewed from the normal direction of the substrate plane of the first substrate.

Item 9

The liquid crystal panel according to any one of items 4 to 8, in which the first substrate further includes a third conductive layer provided on a side opposite to the first conductive layer with respect to the second conductive layer, and a second insulating layer provided between the third conductive layer and the second conductive layer, or the first substrate further includes a third conductive layer provided between the first conductive layer and the second conductive layer, and a second insulating layer provided between the third conductive layer and the first conductive layer, the third conductive layer includes a second connection electrode configured to overlap two or more pixel electrodes as viewed from a normal direction of a substrate plane of the first substrate, and a certain pixel electrode set of the at least one pixel electrode set includes two or more pixel electrodes electrically connected to each other via the second connection electrode.

Item 10

The liquid crystal panel according to item 9, in which the second connection electrode extends in a direction intersecting a direction in which the multiple signal wiring lines extend and overlaps three or more consecutive pixel electrodes among the multiple pixel electrodes as viewed from the normal direction of the substrate plane of the first substrate.

Item 11

The liquid crystal panel according to any one of items 4 to 10, in which the first substrate further includes a third connection electrode formed in the frame region extending in a direction intersecting a direction in which the multiple signal wiring lines extend, and overlapping two or more signal wiring lines of the multiple signal wiring lines as viewed from a normal direction of a substrate plane of the first substrate, and a certain pixel electrode set of the at least one pixel electrode set includes two or more pixel electrodes electrically connected to each other via the third connection electrode.

Item 12

The liquid crystal panel according to item 11, in which the third connection electrode is included in the first conductive layer, and at least two signal wiring lines of the two or more signal wiring lines overlapping the third connection electrode are connected to the third connection electrode in contact holes independently formed in the first insulating layer.

Item 13

The liquid crystal panel according to any one of items 1 to 3, in which the first substrate further includes a first auxiliary electrode configured to fill a space between two pixels adjacent to each other as viewed from a normal direction of a substrate plane of the first substrate, and the first auxiliary electrode is made of a transparent conductive material and is electrically connected to at least one of two pixel electrodes located in the two pixels.

Item 14

The liquid crystal panel according to item 13, in which a certain pixel electrode set of the at least one pixel electrode set includes two or more pixel electrodes electrically connected to each other via the first auxiliary electrode.

Item 15

The liquid crystal panel according to item 14, in which the first substrate includes a first conductive layer including the multiple pixel electrodes, a second conductive layer including the first auxiliary electrode, and a first insulating layer provided between the first conductive layer and the second conductive layer, and the two or more pixel electrodes electrically connected to each other via the first auxiliary electrode are connected to the first auxiliary electrode in contact holes independently formed in the first insulating layer.

Item 16

The liquid crystal panel according to item 15, in which the first substrate further includes a third conductive layer provided on a side opposite to the first conductive layer with respect to the second conductive layer, and a second insulating layer provided between the third conductive layer and the second conductive layer, and the third conductive layer includes the portions of the multiple signal wiring lines located in the active region.

Item 17

The liquid crystal panel according to item 16, in which a certain pixel electrode set of the at least one pixel electrode set includes two or more pixel electrodes connected to a certain signal wiring line of the multiple signal wiring lines in contact holes independently formed in a layered body of the first insulating layer and the second insulating layer.

Item 18

The liquid crystal panel according to item 16 or 17, in which the third conductive layer further includes a second auxiliary electrode configured to fill a space between two pixels adjacent to each other as viewed from the normal direction of the substrate plane of the first substrate, and the second auxiliary electrode is electrically connected to one of two pixel electrodes located in the two pixels, and has a portion not overlapping the first auxiliary electrode as viewed from the normal direction of the substrate plane of the first substrate.

Item 19

The liquid crystal panel according to any one of items 16 to 18, in which the third conductive layer further includes multiple dummy wiring lines.

Item 20

The liquid crystal panel according to any one of items 9, 10, and 16 to 19, in which the second insulating layer includes dummy contact holes formed in regions separately overlapping the multiple pixel electrodes.

Item 21

The liquid crystal panel according to any one of items 9, 10, and 16 to 19, in which the first substrate further includes light blocking layers configured to block light from entering contact holes formed in the second insulating layer.

Item 22

The liquid crystal panel according to any one of items 1 to 21, in which the multiple signal wiring lines include a signal wiring line overlapping two or more pixel electrodes as viewed from a normal direction of a substrate plane of the first substrate.

Item 23

The liquid crystal panel according to any one of items 1 to 22, not including a color filter layer.

Item 24

The liquid crystal panel according to any one of items 1 to 23, not including a black matrix configured to block light from entering between the multiple pixels as viewed from a normal direction of a substrate plane of the first substrate.

Item 25

A display device including the liquid crystal panel according to any one of items 1 to 24 and a display panel located on a back face side with respect to the liquid crystal panel.

Item 26

The display device according to item 25, in which the display panel is an organic EL display panel including an organic EL element layer.

According to the embodiments of the disclosure, it is possible to provide liquid crystal panels that can achieve higher transmittance than known liquid crystal panels and are suitably used as an electro-optical panel located on a viewer's side in a layered display device.

BRIEF DESCRIPTION OF DRAWINGS

The disclosure will be described with reference to the accompanying drawings, wherein like numbers reference like elements.

DESCRIPTION OF EMBODIMENTS

Figure 1:
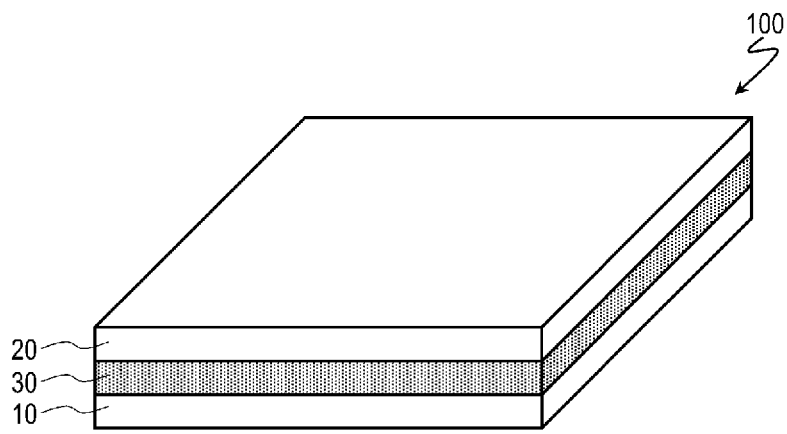
FIG. 1 is a perspective view schematically illustrating a liquid crystal panel 100 according to an embodiment of the disclosure.

Organic EL display devices are self-luminous display devices and can exhibit excellent display performance but require electric power for light emission. On the other hand, reflective liquid crystal display devices utilize ambient light for display and thus can display with low power consumption. Therefore, the reflective liquid crystal display devices are suitable for mobile applications used outdoors (e.g., watch applications). However, the reflective liquid crystal display devices are inferior to the organic EL display devices in display performance (e.g., luminance or color gamut), particularly in environments with weak external light.

Therefore, there is a demand for display devices that can perform self-luminous display when high-quality display is required and can perform reflective display in environments where external light with sufficient intensity is available or when power consumption is to be suppressed (e.g., during constant display).

JP 6700079 B discloses a display device in which a reflective liquid crystal element and an organic EL display element are layered with an adhesive layer/insulating film/adhesive layer interposed therebetween. In this display device, the reflective liquid crystal element includes a reflective electrode and an opening, so that light emitted by the organic EL display element passes through the opening of the reflective liquid crystal element. The reflective liquid crystal element and the organic EL display element included in this display device can each display independently.

In the display device described in JP 6700079 B, an area for reflective display and an area for self-luminous display are separate (divided in terms of area), resulting in a small effective area for each display. As a result, luminance is likely to be insufficient, especially in the reflective display.

Furthermore, high alignment accuracy is required when the reflective liquid crystal element and the organic EL display element are layered with the adhesive layer/insulating film/adhesive layer interposed therebetween so that light emitted from the organic EL display element efficiently passes through the opening of the reflective liquid crystal element.

Therefore, the applicant of the application has proposed, in JP 2022-014177, a display device that does not need to be divided into an area for reflective display and an area for self-luminous display and/or that does not require high alignment accuracy for arrangement of a liquid crystal element relative to an organic EL display element in a manufacturing process of the display device. The entire contents of the disclosure of JP 2022-014177 are incorporated herein by reference.

The display device disclosed in JP 2022-014177 includes an organic EL element layer (organic EL display panel) and a liquid crystal element layer (liquid crystal panel) placed above the organic EL element layer. As a specific configuration of the liquid crystal panel, FIG. 5 in JP 2022-014177 illustrates a configuration in which a signal voltage from a source driver is supplied to a pixel electrode provided in each pixel via only a signal wiring line. FIG. 8 in JP 2022-014177 illustrates a configuration in which thin film transistors (TFTs) electrically connected to pixel electrodes are located on a pixel-by-pixel basis, and signal voltages are supplied to the pixel electrodes via signal wiring lines and the TFTs.

FIG. 6 in JP 2022-014177 illustrates a configuration in which TFTs electrically connected to pixel electrodes, respectively, are located outside an active region, that is, in a frame region. By placing the TFTs in the frame region, transmittance of the liquid crystal panel can be improved. It is conceivable that the liquid crystal panel is provided with memory circuits as will be described later as circuits for driving the respective pixels, and in this case, the transmittance of the liquid crystal panel can be similarly improved by placing the memory circuits in the frame region.

However, in a case in which the TFTs and the memory circuits (hereinafter collectively referred to as "pixel drive circuits") for driving pixels are placed in the frame region, when the number of pixels of the liquid crystal panel increases, the number of pixel drive circuits also increases accordingly, so that an area of the frame region increases. When the number of pixels is reduced (i.e., resolution of the liquid crystal panel is lowered) in order to suppress an increase in the area of the frame region (an increase in the number of pixel drive circuits), the display will naturally become coarse.

Liquid crystal panels according to embodiments of the disclosure can achieve higher transmittance than known liquid crystal panels and can suppress an increase in the area of the frame region by having configurations described below. Hereinafter, the liquid crystal panels according to the embodiments of the disclosure will be described with reference to the accompanying drawings. Note that the embodiments of the disclosure are not limited to those illustrated below.

First Embodiment

Figure 2:
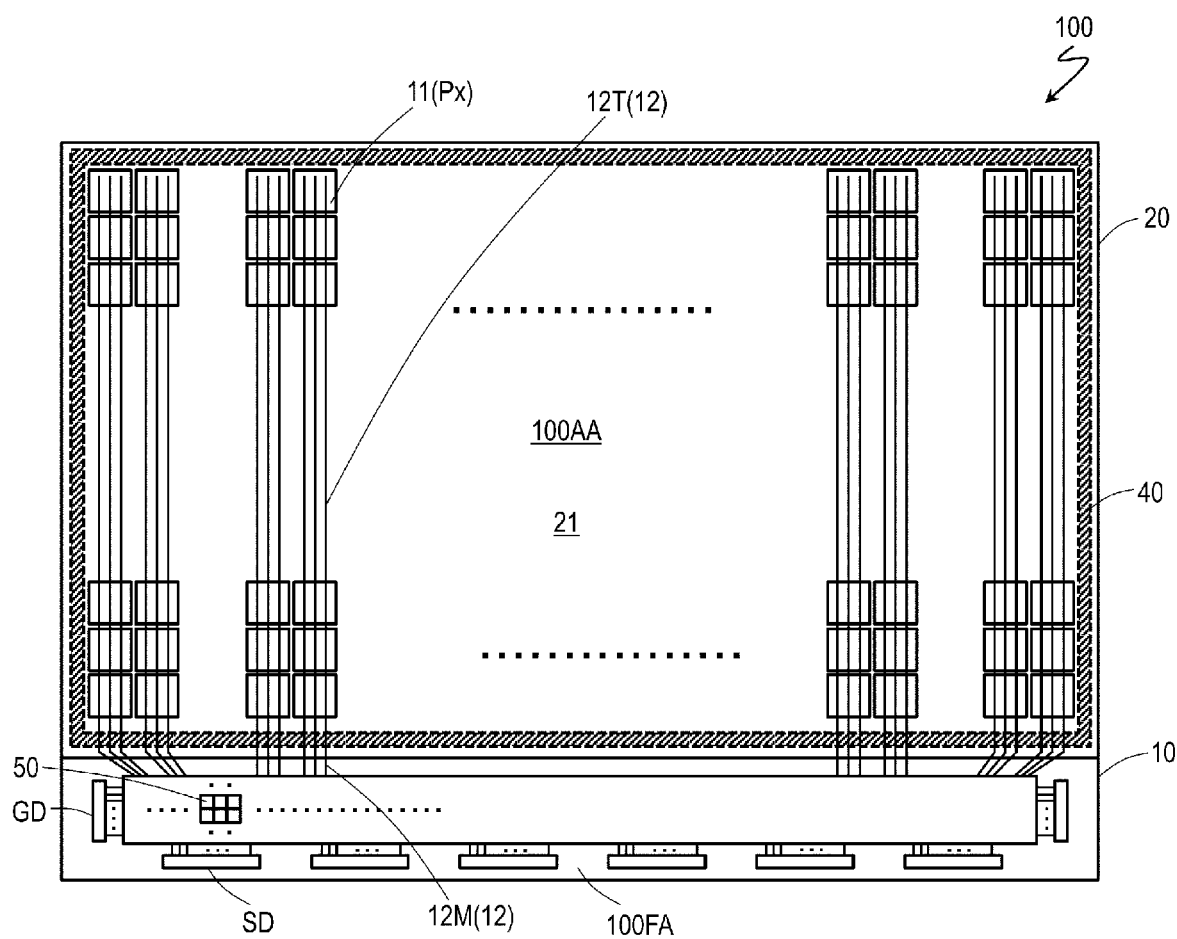
FIG. 2 is a plan view schematically illustrating the liquid crystal panel 100.

A liquid crystal panel 100 according to the present embodiment will be described with reference to FIGS. 1 and 2. FIGS. 1 and 2 are a perspective view and a plan view schematically illustrating the liquid crystal panel 100, respectively.

As illustrated in FIGS. 1 and 2, the liquid crystal panel 100 includes a first substrate 10, a second substrate 20 facing the first substrate 10, and a liquid crystal layer 30 provided between the first substrate 10 and the second substrate 20. The first substrate 10 and the second substrate 20 are bonded to each other with a seal member 40.

The liquid crystal panel 100 includes an active region 100AA including multiple pixels Px and a frame region 100FA positioned around the active region 100AA. In the active region 100AA, the multiple pixels Px are arranged in a matrix including multiple rows and multiple columns.

The first substrate 10 includes multiple pixel electrodes 11 and multiple signal wiring lines 12. Each of the multiple pixel electrodes 11 is located in each pixel Px. The multiple pixel electrodes Px have substantially the same shape, for example, a substantially rectangular shape. The pixel electrodes 11 are made of a transparent conductive material (e.g., indium tin oxide (ITO) or indium zinc oxide (IZO)).

Each of the multiple signal wiring lines 12 is formed to extend from the frame region 100FA to the active region 100AA. Here, the signal wiring lines 12 extend in a column direction. A portion 12T of the signal wiring line 12 located in the active region 100AA is made of a transparent conductive material (e.g., ITO or IZO). A portion 12M of the signal wiring line 12 located in the frame region 100FA may be made of a metal material (e.g., aluminum or copper). Each signal wiring line 12 overlaps two or more pixel electrodes 11 when viewed from a normal direction of a substrate plane of the first substrate 10.

The second substrate 20 includes a common electrode (counter electrode) 21 that faces the pixel electrodes 11 with the liquid crystal layer 30 interposed therebetween. The common electrode 21 may be a single conductive film continuously formed over all the pixels Px. The common electrode 21 is made of a transparent conductive material (e.g., ITO or IZO).

Although not illustrated, alignment films are formed on a surface of the first substrate 10 on a side closer to the liquid crystal layer 30 and on a surface of the second substrate 20 on a side closer to the liquid crystal layer 30. The alignment films may be vertical alignment films or horizontal alignment films depending on a display mode. The display mode is not limited, but from the viewpoint of contrast ratio, for example, VA mode is preferable. For example, when vertical alignment films are used as the alignment films and a pair of polarizers are arranged in a crossed-Nicol configuration so as to sandwich the liquid crystal panel 100, the liquid crystal panel 100 can be operated in a normally black mode.

The liquid crystal panel 100 is suitably used in a display device capable of performing both self-luminous display and reflective display as will be described later. Hereinafter, a state in which a voltage is applied to the liquid crystal layer 30 to provide retardation to light that passes through the liquid crystal layer 30 may be referred to as an "on state" (or a "reflective state") of the liquid crystal panel 100, and a state in which no voltage is applied to the liquid crystal layer 30 not to provide retardation to light that passes through the liquid crystal layer 30 may be referred to as an "off state" (or a "transmitting state") of the liquid crystal panel 100.

The liquid crystal panel 100 further includes multiple pixel drive circuits 50 located outside the active region 100AA. In the example illustrated, the multiple pixel drive circuits 50 are located in the frame region 100FA. Each pixel drive circuit 50 is, for example, a memory circuit (e.g., SRAM). A liquid crystal panel with memory circuits for driving respective pixels may be referred to as a "memory liquid crystal". A specific configuration of a memory liquid crystal is disclosed in, for example, JP 5036864 B. The entire disclosure of JP 5036864 B is incorporated herein by reference. Various known memory circuits used for memory liquid crystals can be used as the pixel drive circuits 50. However, whereas memory circuits are located in respective pixels in an active region in a typical memory liquid crystal, when the memory circuits are used as the pixel drive circuits 50 of the liquid crystal panel 100, the memory circuits are located in the frame region 100FA. Note that the pixel drive circuit 50 is not limited to the memory circuit. For example, the pixel drive circuit 50 may be a TFT. A signal voltage is applied to each pixel electrode 11 from one of the multiple pixel drive circuits 50 via the corresponding signal wiring line 12. The pixel drive circuits 50 may be placed so that at least some of them do not overlap the first substrate 10 (e.g., when the pixel drive circuits 50 are COF mounted).

In the frame region 100FA, a gate driver GD and a source driver SD that supply a gate signal and a source signal to the pixel drive circuit 50, respectively, are further placed. The gate driver GD and the source driver SD may be monolithically formed on the first substrate 10 or may be mounted on the first substrate 10.

Although FIG. 2 illustrates an example in which the frame region 100FA is located only on a lower side of the active region 100AA, the frame region 100FA may be located on an upper side, a right side, and/or a left side of the active region 100AA in addition to (or instead of) the lower side of the active region 100AA.

The liquid crystal panel 100 does not include a color filter layer. The liquid crystal panel 100 does not include a black matrix that blocks light from entering between the multiple pixels Px when viewed from a normal direction of a display surface.

Figure 3:
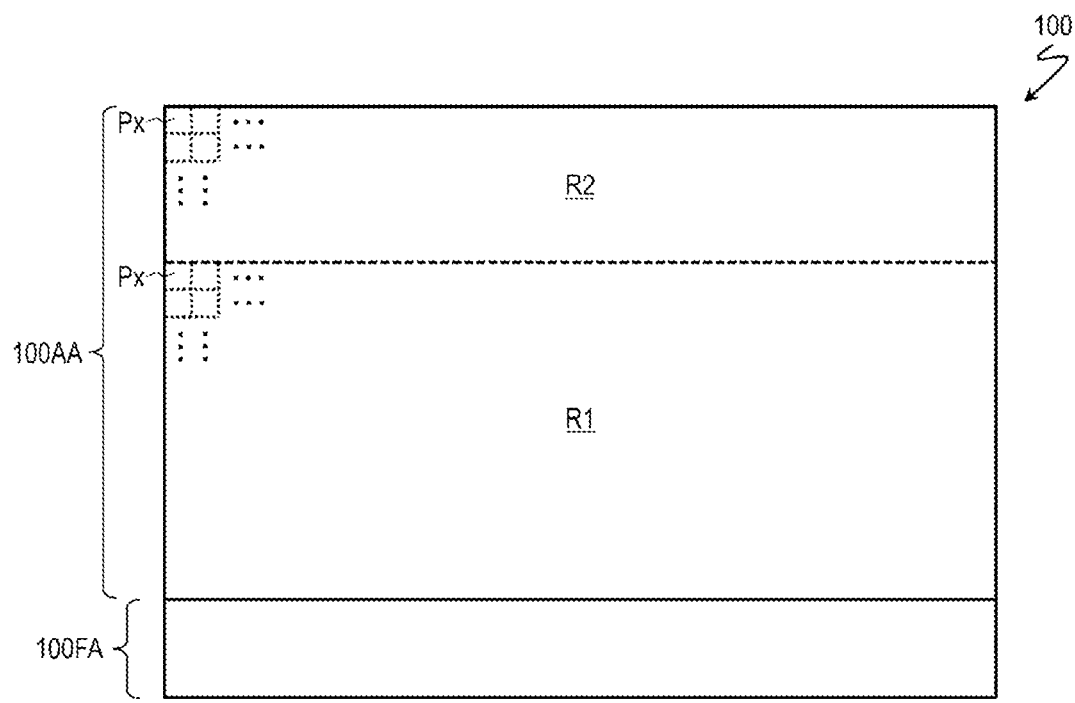
FIG. 3 is a diagram illustrating an arrangement example of a first display region R1 and a second display region R2 in an active region 100AA of the liquid crystal panel 100.

The active region 100AA of the liquid crystal panel 100 includes two types of display regions. Hereinafter, one of the two types of display regions will be referred to as a "first display region", and the other is referred to as a "second display region". FIG. 3 illustrates an arrangement example of a first display region R1 and a second display region R2 in the active region 100AA.

In the example illustrated in FIG. 3, each of the first display region R1 and the second display region R2 has a substantially rectangular shape, and in the active region 100AA, the second display region R2 is located above the first display region R1. A size of the second display region R2 is smaller than a size of the first display region R1.

Among the multiple pixels Px in the active region 100AA, some pixels Px define the first display region R1 and some other (i.e., remaining) pixels Px define the second display region R2. Hereinafter, the two or more pixels Px that define the first display region R1 may be referred to as a "first group of pixels", and the two or more pixels Px that define the second display region R2 may be referred to as a "second group of pixels".

Among the multiple pixel electrodes 11, the pixel electrodes 11 located in the first display region R1 (i.e., in the first group of pixels Px) are electrically independent on a pixel-by-pixel basis. The pixel electrodes 11 in the first display region R1 are electrically connected to separate pixel drive circuits 50. The first display region R1 is a region in which matrix display is possible with one pixel Px as a minimum unit. Hereinafter, the first display region R1 may be referred to as a "matrix display region".

On the other hand, among the multiple pixel electrodes 11, the pixel electrodes 11 located in the second display region R2 (i.e., in the second group of pixels Px) include at least one pixel electrode set including two or more pixel electrodes 11 electrically connected to each other. Two or more pixel electrodes 11 included in an individual pixel electrode set are electrically connected to a common pixel drive circuit 50. Therefore, by arranging the pixel electrodes 11 included in the pixel electrode set in a predetermined pattern, the predetermined pattern can be displayed by one pixel drive circuit 50. For example, when the pixel electrodes 11 included in the pixel electrode set are arranged in a specific icon shape, an icon can be displayed by one pixel drive circuit 50. Hereinafter, the second display region R2 may be referred to as an "icon display region".

Note that shapes, positions, and sizes (ratios occupied in the active region 100AA) of the matrix display region (first display region) R1 and the icon display region (second display region) R2 are not limited to the example illustrated in FIG. 3. For example, the shape of each of the matrix display region R1 and the icon display region R2 may be a substantially polygonal shape other than the substantially rectangular shape, or may be a substantially circular shape, a substantially elliptical shape, or the like. However, in consideration of ease of manufacturing and the like, it is preferable that the matrix display region R1 have a substantially rectangular shape. Considering that a typical liquid crystal panel has a substantially rectangular shape, it is preferable that the icon display region R2 also have a substantially rectangular shape. The icon display region R2 may be located below, the right side, or the left side of the matrix display region R1. The size of the icon display region R2 may be substantially the same as the size of the matrix display region R1, or may be larger than the size of the matrix display region R1.

Figure 4A:
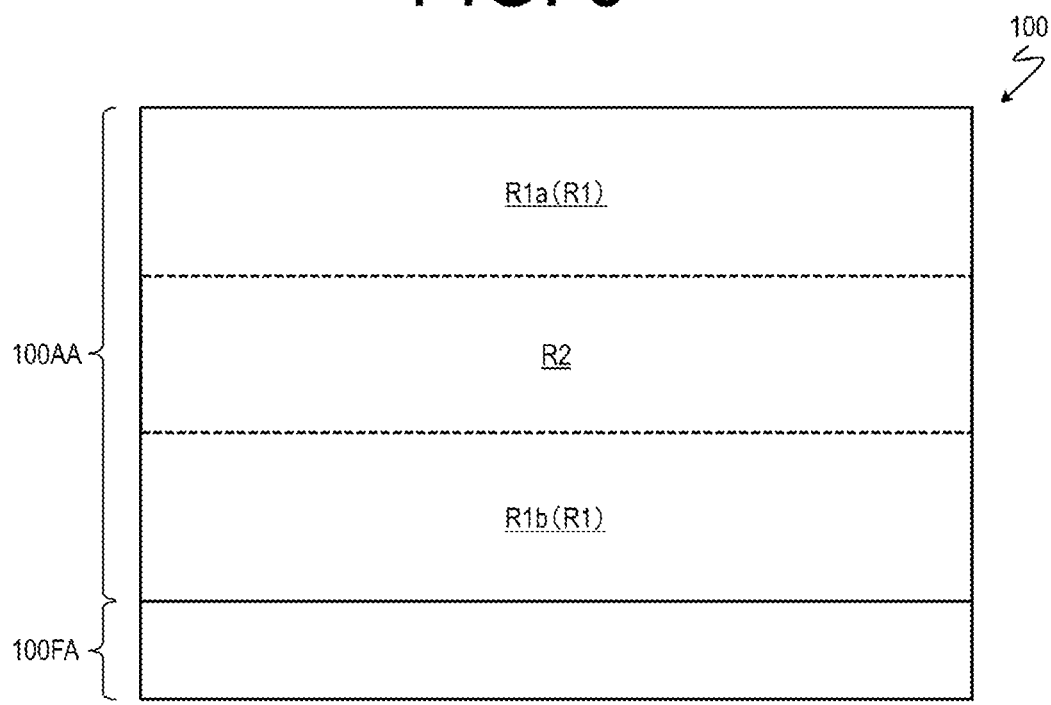
FIG. 4A is a diagram illustrating an arrangement example of the first display region R1 and the second display region R2 in the active region 100AA of the liquid crystal panel 100.
Figure 4B:
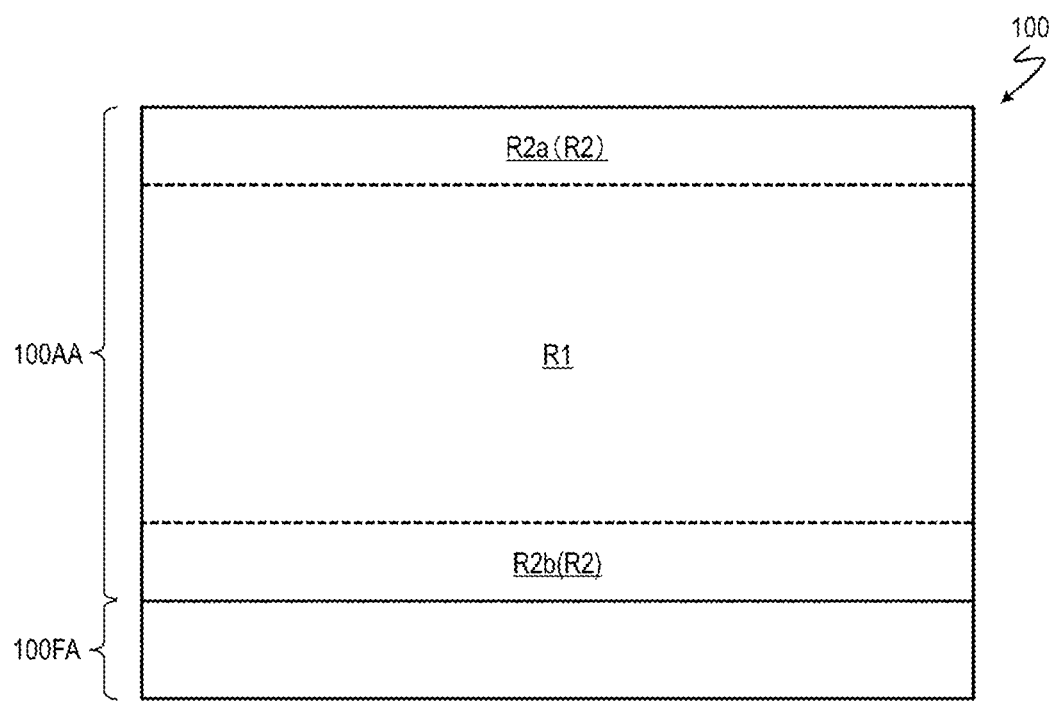
FIG. 4B is a diagram illustrating an arrangement example of the first display region R1 and the second display region R2 in the active region 100AA of the liquid crystal panel 100.

In the example illustrated in FIG. 3, each of the matrix display region R1 and the icon display region R2 is arranged so as to be continuous as a whole, but the matrix display region R1 may include multiple (here, two) portions R1a and R1b separated by the icon display region R2 as illustrated in FIG. 4A, or the icon display region R2 may include multiple (here, two) portions R2a and R2b separated by the matrix display region R1 as illustrated in FIG. 4B.

Figure 5A:
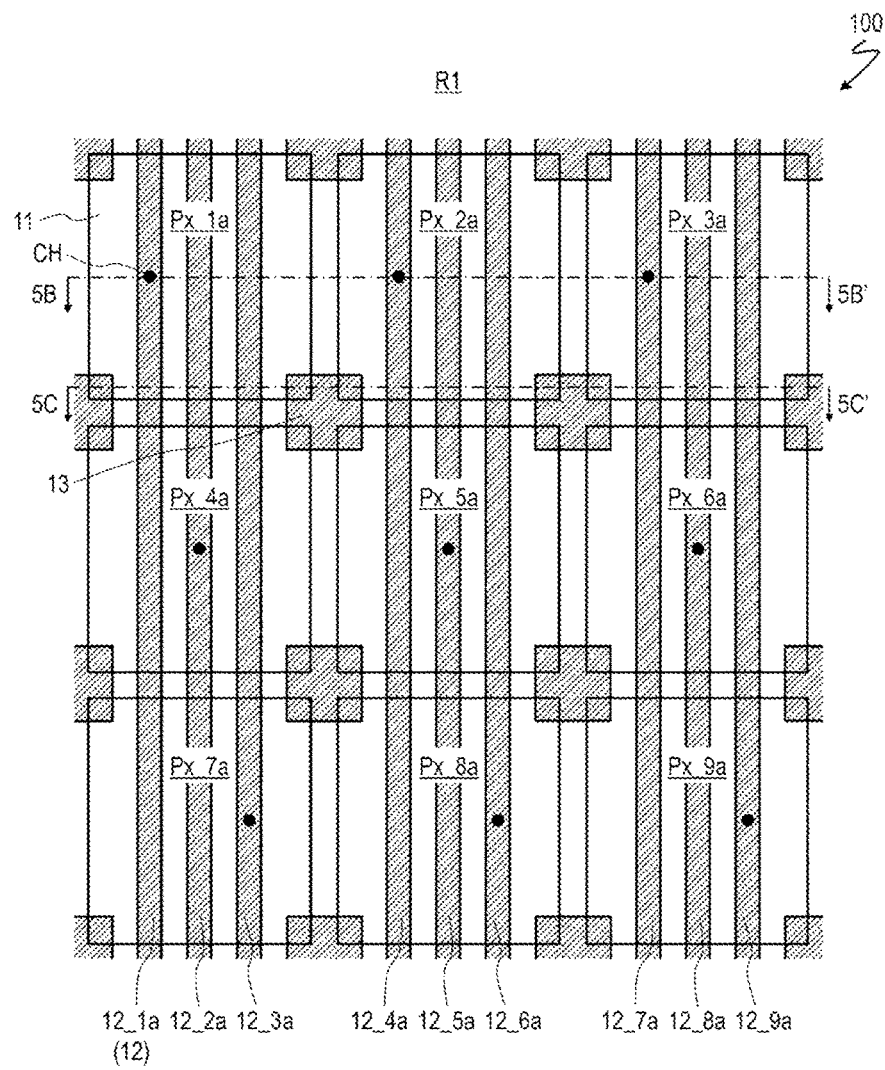
FIG. 5A is a plan view illustrating a matrix display region (first display region) R1 of the liquid crystal panel 100, illustrating a region corresponding to nine pixels Px.

Next, a more specific configuration of the liquid crystal panel 100 according to the present embodiment will be described. First, a configuration in the matrix display region R1 will be described with reference to FIGS. 5A, 5B, and 5C. FIG. 5A is a plan view illustrating the matrix display region R1 of the liquid crystal panel 100, and FIGS. 5B and 5C are cross-sectional views taken along lines 5B-5B' and 5C-5C' in FIG. 5A, respectively.

As already explained, the matrix display region R1 is defined by the first group of pixels Px. FIG. 5A illustrates a region corresponding to nine pixels Px arranged in three rows and three columns among the first group of pixels Px. Hereinafter, for ease of description, the nine pixels Px are referred to as a first pixel Px_1a, a second pixel Px_2a, a third pixel Px_3a, a fourth pixel Px_4a, a fifth pixel Px_5a, a sixth pixel Px_6a, a seventh pixel Px_7a, an eighth pixel Px_8a, and a ninth pixel Px_9a in order from an upper left. Among nine signal wiring lines 12 illustrated in FIG. 5A, the signal wiring line 12 located at an n-th position from a left side is referred to as "n-th signal wiring line 12_na".

Figure 5B:
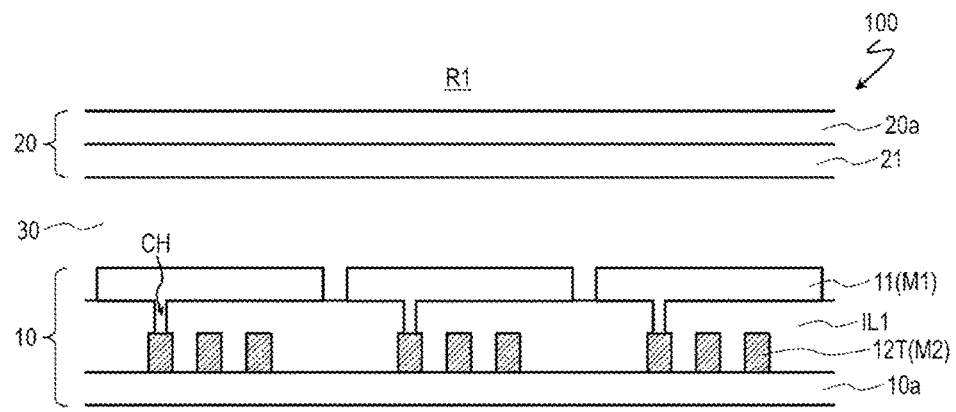
FIG. 5B is a cross-sectional view illustrating the matrix display region R1 of the liquid crystal panel 100, illustrating a cross section taken along line 5B-5B' in FIG. 5A.
Figure 5C:
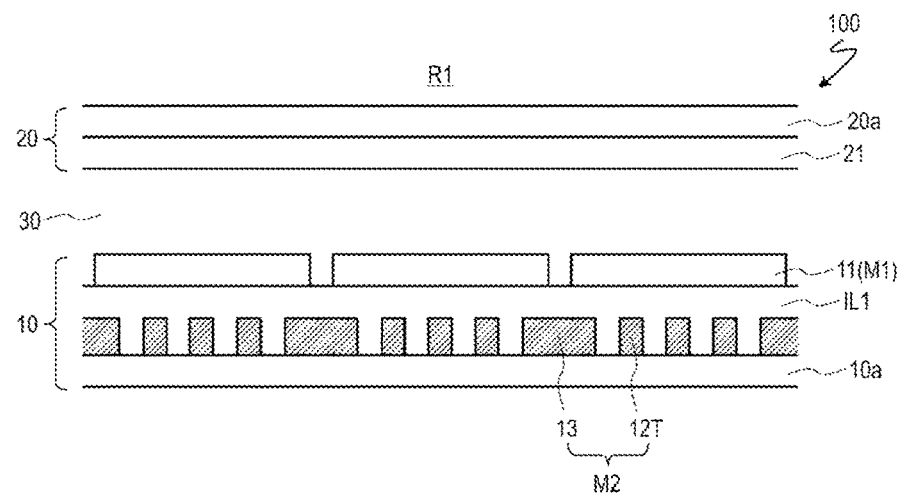
FIG. 5C is a cross-sectional view illustrating the matrix display region R1 of the liquid crystal panel 100, illustrating a cross section taken along line 5C-5C' in FIG. 5A.

As illustrated in FIGS. 5B and 5C, the first substrate 10 includes a first conductive layer M1 including the multiple pixel electrodes 11, a second conductive layer M2 including the portions 12T of the multiple signal wiring lines 12 located in the active region 100AA, and a first insulating layer IL1 provided between the first conductive layer M1 and the second conductive layer M2. The first conductive layer M1, the second conductive layer M2, and the first insulating layer IL1 are supported by an insulating transparent substrate 10a. The transparent substrate 10a is, for example, a glass substrate or a plastic substrate.

The first insulating layer IL1 is formed so as to cover the second conductive layer M2, and the first conductive layer M1 is formed on the first insulating layer IL1. That is, the second conductive layer M2, the first insulating layer IL1, and the first conductive layer M1 are layered in this order on the transparent substrate 10a. The first insulating layer IL1 may be an organic insulating layer. The organic insulating layer may be made of a photosensitive resin material, for example. A thickness of the organic insulating layer is, for example, 2 μm.

Each pixel electrode 11 is connected to a corresponding signal wiring line 12 (12T) in a contact hole CH formed in the first insulating layer IL1.

The second substrate 20 includes the common electrode 21 that faces the pixel electrodes 11 with the liquid crystal layer 30 interposed therebetween. The common electrode 21 is supported by an insulating transparent substrate 20a. The transparent substrate 20a is, for example, a glass substrate or a plastic substrate.

As illustrated in FIGS. 5A and 5C, the first substrate 10 further includes multiple first connection electrodes 13. Each of the multiple first connection electrodes 13 overlaps two or more adjacent pixel electrodes 11 when viewed from the normal direction of the substrate plane (also referred to as the "normal direction of the display surface") of the first substrate 10. Here, each first connection electrode 13 overlaps four pixel electrodes 11 arranged in two rows and two columns. Here, the first connection electrodes 13 are formed in the same layer as the portions 12T of the signal wiring lines 12 located in the active region 100AA. That is, the first connection electrodes 13 are included in the second conductive layer M2. In the matrix display region R1, the pixel electrodes 11 are not electrically connected to any of the first connection electrodes 13.

In the matrix display region R1, the multiple pixel electrodes 11 are electrically connected to separate signal wiring lines 12. For example, the pixel electrodes 11 of the first pixel Px_1a, the second pixel Px_2a, and the third pixel Px_3a illustrated in FIG. 5A are electrically connected to a first signal wiring line 12_1a, a fourth signal wiring line 12_4a, and a seventh signal wiring line 12_7a, respectively. The pixel electrodes 11 of the fourth pixel Px_4a, the fifth pixel Px_5a, and the sixth pixel Px_6a are electrically connected to a second signal wiring line 12_2a, a fifth signal wiring line 12_5a, and an eighth signal wiring line 12_8a, respectively, and the pixel electrodes 11 of the seventh pixel Px_7a, the eighth pixel Px_8a, and the ninth pixel Px_9a are electrically connected to a third signal wiring line 12_3a, a sixth signal wiring line 12_6a, and a ninth signal wiring line 12_9a, respectively. The first to ninth signal wiring lines 12_1a to 12_9a are connected to separate pixel drive circuits 50 in the frame region 100FA.

The above-described configuration enables matrix display with one pixel Px as a minimum unit in the matrix display region R1.

Figure 6A:
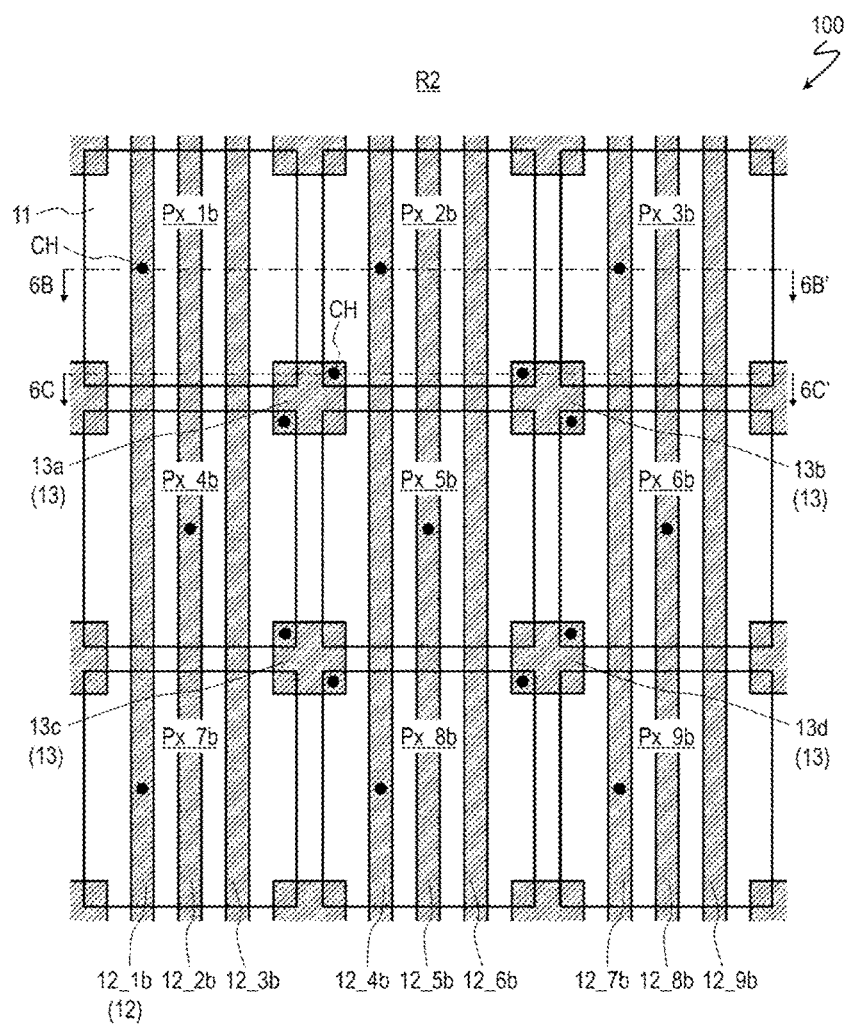
FIG. 6A is a plan view illustrating an icon display region (second display region) R2 of the liquid crystal panel 100, illustrating a region corresponding to nine pixels Px.

Next, a configuration of the icon display region R2 will be described with reference to FIGS. 6A, 6B, and 6C. FIG. 6A is a plan view illustrating the icon display region R2 of the liquid crystal panel 100, and FIGS. 6B and 6C are cross-sectional views taken along lines 6B-6B' and 6C-6C' in FIG. 6A, respectively.

As already explained, the icon display region R2 is defined by the second group of pixels Px. FIG. 6A illustrates a region corresponding to nine pixels Px arranged in three rows and three columns among the second group of pixels Px. Hereinafter, for ease of description, the nine pixels Px are referred to as a first pixel Px_1b, a second pixel Px_2b, a third pixel Px_3b, a fourth pixel Px_4b, a fifth pixel Px_5b, a sixth pixel Px_6b, a seventh pixel Px_7b, an eighth pixel Px_8b, and a ninth pixel Px_9b in order from the upper left. Among nine signal wiring lines 12 illustrated in FIG. 6A, the signal wiring line 12 located at an n-th position from a left side is referred to as "n-th signal wiring line 12_nb".

Figure 6B:
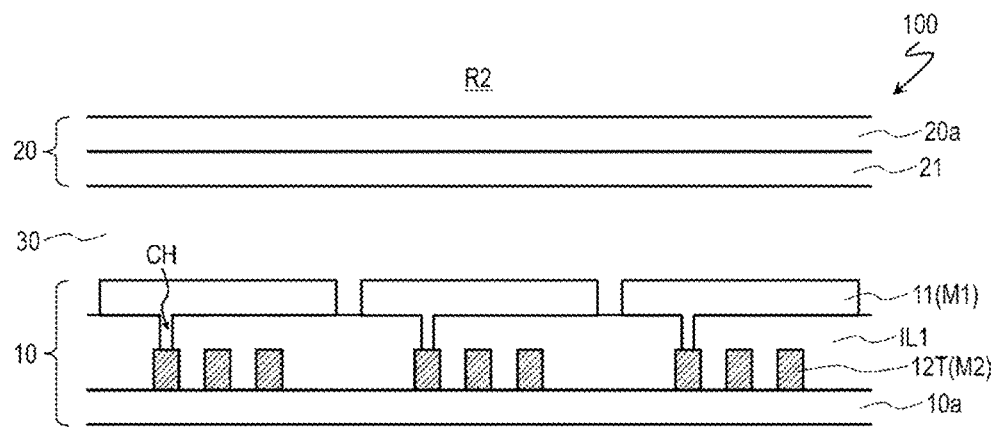
FIG. 6B is a cross-sectional view illustrating the icon display region R2 of the liquid crystal panel 100, illustrating a cross section taken along line 6B-6B' in FIG. 6A.
Figure 6C:
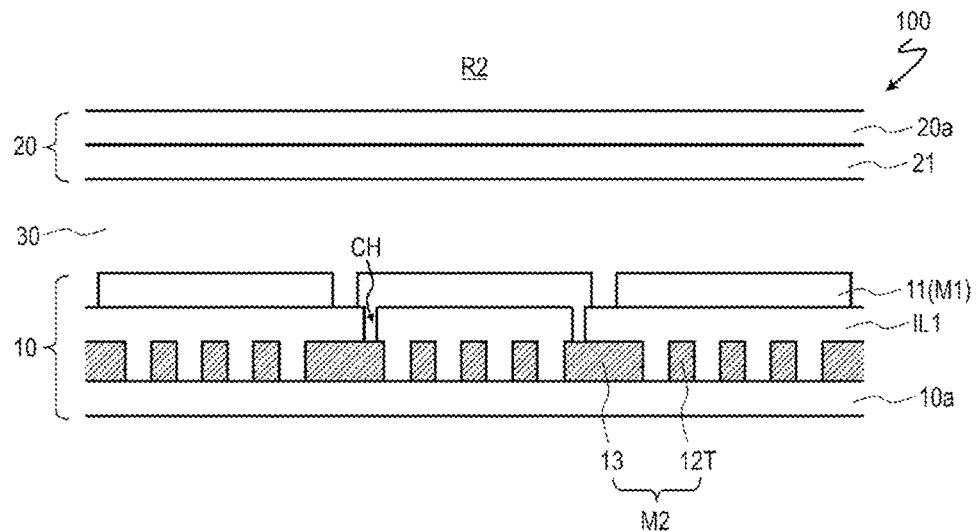
FIG. 6C is a cross-sectional view illustrating the icon display region R2 of the liquid crystal panel 100, illustrating a cross section taken along line 6C-6C' in FIG. 6A.

As illustrated in FIGS. 6B and 6C, also in the icon display region R2, the first substrate 10 includes the first conductive layer M1, the second conductive layer M2, and the first insulating layer IL1, and the second conductive layer M2 includes multiple first connection electrodes 13.

As already explained, the multiple pixel electrodes 11 located in the icon display region R2 include at least one pixel electrode set including two or more pixel electrodes 11 electrically connected to each other.

For example, among the nine pixel electrodes 11 illustrated in FIG. 6A, the pixel electrodes 11 of the first pixel Px_1b and the seventh pixel Px_7b are electrically connected to each other and included in a "first pixel electrode set". The pixel electrodes 11 of the second pixel Px_2b, the fourth pixel Px_4b, the sixth pixel Px_6b, and the eighth pixel Px_8b are electrically connected to each other and included in a "second pixel electrode set". The pixel electrodes 11 of the third pixel Px_3b and the ninth pixel Px_9b are electrically connected to each other and included in a "third pixel electrode set".

The two pixel electrodes 11 included in the first pixel electrode set (i.e., the first pixel Px_1b and the seventh pixel Px_7b) are connected to a first signal wiring line 12_1b in contact holes CH independently formed in the first insulating layer IL1. Therefore, the pixel electrodes 11 of the first pixel Px_1b and the seventh pixel Px_7b are electrically connected to each other via the first signal wiring line 12_1b, and a signal voltage is applied to the pixel electrodes 11 of the first pixel Px_1b and the seventh pixel Px_7b from a common pixel drive circuit 50.

Similarly, the two pixel electrodes 11 included in the third pixel electrode set (i.e., the third pixel Px_3b and the ninth pixel Px_9b) are connected to a seventh signal wiring line 12_7b in contact holes CH independently formed in the first insulating layer IL1. Therefore, the pixel electrodes 11 of the third pixel Px_3b and the ninth pixel Px_9b are electrically connected to each other via the seventh signal wiring line 12_7b, and a signal voltage is applied to the pixel electrodes 11 of the third pixel Px_3b and the ninth pixel Px_9b from a common pixel drive circuit 50.

Among the four pixel electrodes 11 included in the second pixel electrode set, the pixel electrodes 11 of the second pixel Px_2b and the fourth pixel Px_4b are connected to a first connection electrode 13a located at an upper left of the fifth pixel Px_5b in contact holes CH independently formed in the first insulating layer IL1, and the pixel electrodes 11 of the second pixel Px_2b and the sixth pixel Px_6b are connected to a first connection electrode 13b located at upper right of the fifth pixel Px_5b in contact holes CH independently formed in the first insulating layer IL1. Similarly, the pixel electrodes 11 of the fourth pixel Px_4b and the eighth pixel Px_8b are connected to a first connection electrode 13c located at lower left of the fifth pixel Px_5b in contact holes CH independently formed in the first insulating layer IL1, and the pixel electrodes 11 of the sixth pixel Px_6b and the eighth pixel Px_8b are connected to a first connection electrode 13d located at lower right of the fifth pixel Px_5b in contact holes CH independently formed in the first insulating layer IL1. Thus, the four pixel electrodes 11 included in the second pixel electrode set (i.e., the second pixel Px_2b, the fourth pixel Px_4b, the sixth pixel Px_6b, and the eighth pixel Px_8b) are electrically connected to each other via four first connection electrodes 13.

The pixel electrodes 11 of the second pixel Px_2b and the eighth pixel Px_8b are electrically connected to a fourth signal wiring line 12_4b, the pixel electrode 11 of the fourth pixel Px_4b is electrically connected to a second signal wiring line 12_2b, and the pixel electrode 11 of the sixth pixel Px_6b is electrically connected to an eighth signal wiring line 12_8b. The second signal wiring line 12_2b, the fourth signal wiring line 12_4b, and the eighth signal wiring line 12_8b are electrically connected to a common pixel drive circuit 50, and a signal voltage is applied to the pixel electrodes 11 of the second pixel Px_2b, the fourth pixel Px_4b, the sixth pixel Px_6b, and the eighth pixel Px_8b from the common pixel drive circuit 50. Note that the four pixel electrodes 11 included in the second pixel electrode set only need to be electrically connected to each other, and as long as the four pixel electrodes 11 are electrically connected to each other, some of the connection relationships described above may be omitted.

The pixel electrode 11 of the fifth pixel Px_5b is not electrically connected to the other pixel electrodes 11. The pixel electrode 11 of the fifth pixel Px_5b is electrically connected to a fifth signal wiring line 12_5b, and a signal voltage is applied from a corresponding pixel drive circuit 50 via the fifth signal wiring line 12_5b.

Figure 7:
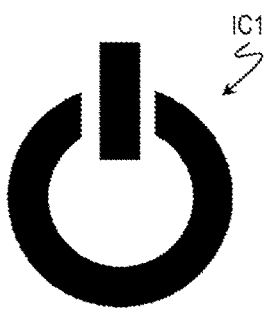
FIG. 7 is a diagram illustrating an example of an icon that can be displayed by one pixel drive circuit 50.

With such a configuration, desired display can be achieved in the icon display region R2 with a relatively small number of pixel drive circuits 50. For example, in the matrix display region R1, nine pixel drive circuits 50 are required to drive the nine pixels Px illustrated in FIG. 5A, whereas in the icon display region R2, the nine pixels Px illustrated in FIG. 6A can be driven by four pixel drive circuits 50. An arrangement pattern of the pixel electrodes 11 included in the pixel electrode sets in the icon display region R2 is, of course, not limited to that illustrated in FIG. 6A. In the icon display region R2, for example, an icon IC1 illustrated in FIG. 7 can be displayed with one pixel drive circuit 50.

As described above, in the liquid crystal panel 100 in the present embodiment, the multiple pixel drive circuits 50 are located in the frame region 100FA, so that transmittance can be improved and higher transmittance than known liquid crystal panels can be achieved. In addition, in the liquid crystal panel 100 in the present embodiment, the pixel electrodes 11 located in the second display region (icon display region) R2 include the pixel electrode sets including two or more pixel electrodes 11 electrically connected to each other, the total number of pixel drive circuits 50 located in the frame region 100FA can be reduced. Therefore, an increase in an area of the frame region 100FA can be suppressed.

In the liquid crystal panel 100 in the present embodiment, the multiple pixel electrodes Px may have substantially the same shape as illustrated. Therefore, the icon pattern is prevented from being visually recognized when the liquid crystal panel 100 is in a transmitting state. On the other hand, when one pixel electrode is formed in a specific icon shape (i.e., in a special size and shape), the icon pattern may be visually recognized when the liquid crystal panel is in the transmitting state.

Note that, as illustrated, the icon display region R2 may include a pixel electrode 11 that is not electrically connected to other pixel electrodes 11 (the pixel electrode 11 of the fifth pixel Px_5b in the example illustrated in FIG. 6A).

Although an example in which two pixel electrodes 11 are connected to one first connection electrode 13 is illustrated here, three or more pixel electrodes 11 may be connected to one first connection electrode 13. The illustrated first connection electrode 13 overlaps the four pixel electrodes 11, so one first connection electrode 13 can electrically connect up to four pixel electrodes 11. The first connection electrode 13 only needs to overlap at least two pixel electrodes 11, but preferably overlaps three or more pixel electrodes 11, and more preferably overlaps four pixel electrodes 11.

From the viewpoint of improving the transmittance of the liquid crystal panel 100, it is preferable that not only the pixel electrodes 11 and the common electrode 21 be made of a transparent conductive material, but also the portions 12T of the signal wiring lines 12 located in the active region 100AA and the first connection electrodes 13 (i.e., the second conductive layer M2) be also made of a transparent conductive material, as exemplified in the present embodiment.

In the active region 100AA, when the second conductive layer M2 is formed in a substantially uniform pattern, it is difficult to visually recognize dense areas and sparse areas in the second conductive layer M2. For example, from the viewpoint of simply displaying, the first connection electrodes 13 in the matrix display region R1 may be omitted, but from the viewpoint of making it difficult to visually recognize the dense areas and sparse areas in the second conductive layer M2, it is preferable that the first connection electrodes 13 be also provided in the matrix display region R1. Similarly, from the viewpoint of simply displaying, the signal wiring lines 12 do not need to extend over the entire active region 100AA along the column direction, and for example, portions located above the contact holes CH in FIG. 5A may be omitted. However, from the viewpoint of making it difficult to visually recognize the dense areas and sparse areas in the second conductive layer M2, it is preferable that the signal wiring lines 12 extend over the entire active region 100AA along the column direction.

Note that although FIGS. 5A to 6C illustrate an example in which three signal wiring lines 12 are arranged in one pixel column for simplicity of description, the number of signal wiring lines 12 arranged in one pixel column is not limited thereto. The number of signal wiring lines 12 arranged in one pixel column may be, for example, the same as the number of pixels Px included in one pixel column (i.e., the number of pixel rows).

Although an example in which the active region 100AA includes the first display region (matrix display region) R1 and the second display region (icon display region) R2 is illustrated here, the active region 100AA may include only the second display region R2 (i.e., may not include the first display region R1).

Second Embodiment

Figure 8A:
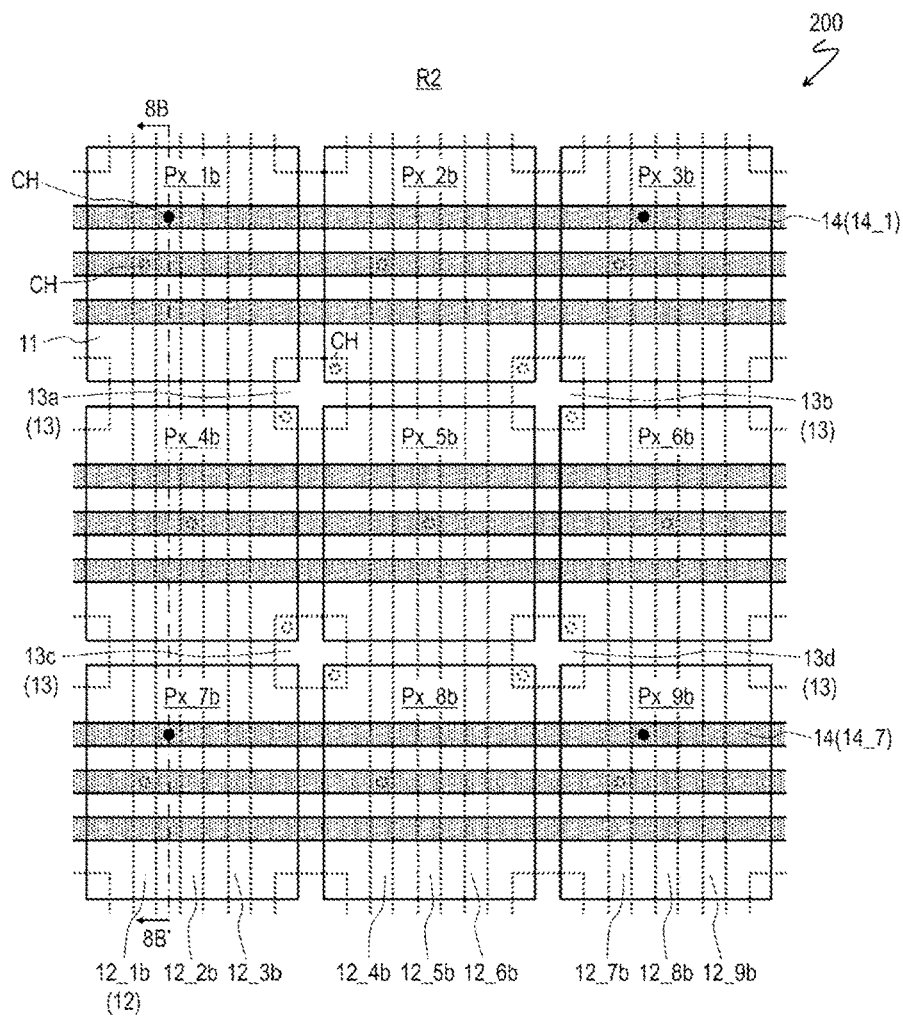
FIG. 8A is a plan view schematically illustrating another liquid crystal panel 200 according to an embodiment of the disclosure, illustrating a region corresponding to nine pixels Px in an icon display region R2 of the liquid crystal panel 200.
Figure 8B:
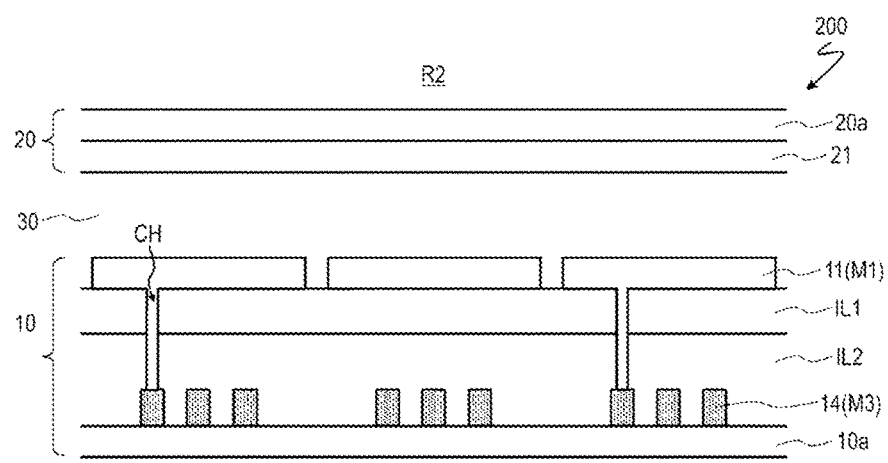
FIG. 8B is a cross-sectional view illustrating the icon display region R2 of the liquid crystal panel 200, illustrating a cross section taken along a line 8B-8B' in FIG. 8A.

A liquid crystal panel 200 according to the present embodiment will be described with reference to FIGS. 8A and 8B. FIG. 8A is a plan view illustrating an icon display region R2 of the liquid crystal panel 200, and FIG. 8B is a cross-sectional view taken along line 8B-8B' in FIG. 8A. The following description will focus on points in which the liquid crystal panel 200 differs from the liquid crystal panel 100 in the first embodiment (the same applies to subsequent embodiments).

Similar to FIG. 6A, FIG. 8A illustrates a region corresponding to nine pixels Px (first pixel Px_1b to ninth pixel Px_9b) arranged in three rows and three columns among a second group of pixels Px. In FIG. 8A, a second conductive layer M2 including first connection electrodes 13 and the like are indicated by dotted lines for ease of understanding.

The liquid crystal panel 200 in the present embodiment differs from the liquid crystal panel 100 in the first embodiment in that, as illustrated in FIG. 8B, a first substrate 10 further includes a third conductive layer M3 provided on an opposite side of a first conductive layer M1 with respect to a second conductive layer M2 (not illustrated in FIG. 8B but provided below the first conductive layer M1 with a first insulating layer IL1 interposed therebetween as illustrated in FIG. 6B), and a second insulating layer IL2 provided between the third conductive layer M3 and the second conductive layer M2.

The second insulating layer IL2 may be an organic insulating layer. The organic insulating layer may be made of a photosensitive resin material, for example. A thickness of the organic insulating layer is, for example, 2 μm. The first insulating layer IL1 may be an inorganic insulating layer. The inorganic insulating layer is, for example, a silicon nitride (SiN$_x$) layer. A thickness of the inorganic insulating layer is, for example, 100 nm.

The third conductive layer M3 is made of a transparent conductive material (e.g., ITO or IZO). The third conductive layer M3 includes multiple second connection electrodes 14. Each of the multiple second connection electrodes 14 overlaps two or more pixel electrodes 11 when viewed from a normal direction of a substrate plane of the first substrate 10. Here, each second connection electrode 14 is formed so as to extend in a row direction (i.e., a direction intersecting a direction in which signal wiring lines 12 extend) and overlaps three or more pixel electrodes 11 that are consecutive in the row direction. In the following description, among the nine second connection electrodes 14 illustrated in FIG. 8A, the second connection electrode 14 located at an n-th position from the top is referred to as "n-th second connection electrode 14_n".

In the example illustrated in FIGS. 8A and 8B, the pixel electrodes 11 of the first pixel Px_1b and the third pixel Px_3b are connected to a first second connection electrode 14_1 in contact holes CH independently formed in a layered body of the first insulating layer IL1 and the second insulating layer IL2, and are electrically connected to each other via the first second connection electrode 14_1. The pixel electrodes 11 of the seventh pixel Px_7b and the ninth pixel Px_9b are connected to a seventh second connection electrode 14_7 in contact holes CH independently formed in the layered body of the first insulating layer IL1 and the second insulating layer IL2, and are electrically connected to each other via the seventh second connection electrode 14_7. Therefore, the pixel electrodes 11 of the first pixel Px_1b, the third pixel Px_3b, the seventh pixel Px_7b, and the ninth pixel Px_9b are electrically connected to each other via two signal wiring lines 12_1b and 12_7b and the two second connection electrodes 14_1 and 14_7, and included in one pixel electrode set. In this case, the two signal wiring lines 12_1b and 12_7b are electrically connected to a common pixel drive circuit 50.

Figure 9:
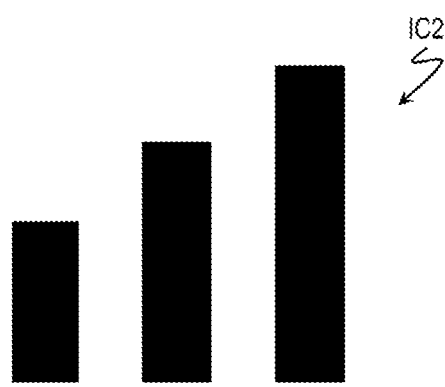
FIG. 9 is a diagram illustrating an example of an icon that can be displayed by one pixel drive circuit 50.

As described above, in the liquid crystal panel 200 in the present embodiment, the third conductive layer M3 including the second connection electrodes 14 is provided in the first substrate 10, so that the pixel electrodes 11 of two pixels Px adjacent to each other with at least one different pixel Px interposed therebetween in the row direction can be electrically connected to each other, thereby further reducing the total number of the pixel drive circuits 50. For example, while the nine pixels Px illustrated in FIG. 6A are driven by four pixel drive circuits 50, the nine pixels Px illustrated in FIG. 8A can be driven by three pixel drive circuits 50. Note that an arrangement pattern of the pixel electrodes 11 included in the pixel electrode sets is, of course, not limited to that illustrated in FIG. 8A. By adopting a configuration in which the third conductive layer M3 including the second connection electrodes 14 is provided in the first substrate 10 as in the present embodiment, for example, an icon IC2 as illustrated in FIG. 9 can be displayed with one pixel drive circuit 50.

Note that an example in which two pixel electrodes 11 are connected to one second connection electrode 14 is illustrated here, but three or more pixel electrodes 11 may be connected to one second connection electrode 14.

From the viewpoint of improving transmittance of the liquid crystal panel 200, the third conductive layer M3 is preferably made of a transparent conductive material, as exemplified in the present embodiment.

In an active region 100AA, when the third conductive layer M3 is formed in a substantially uniform pattern, it is difficult to visually recognize dense areas and sparse areas in the third conductive layer M3. For example, from the viewpoint of simply displaying, the second connection electrodes 14 in a matrix display region R1 may be omitted. However, from the viewpoint of making it difficult to visually recognize the dense areas and sparse areas in the third conductive layer M3, it is preferable that the second connection electrodes 14 be also provided in the matrix display region R1.

Third Embodiment

Figure 10A:
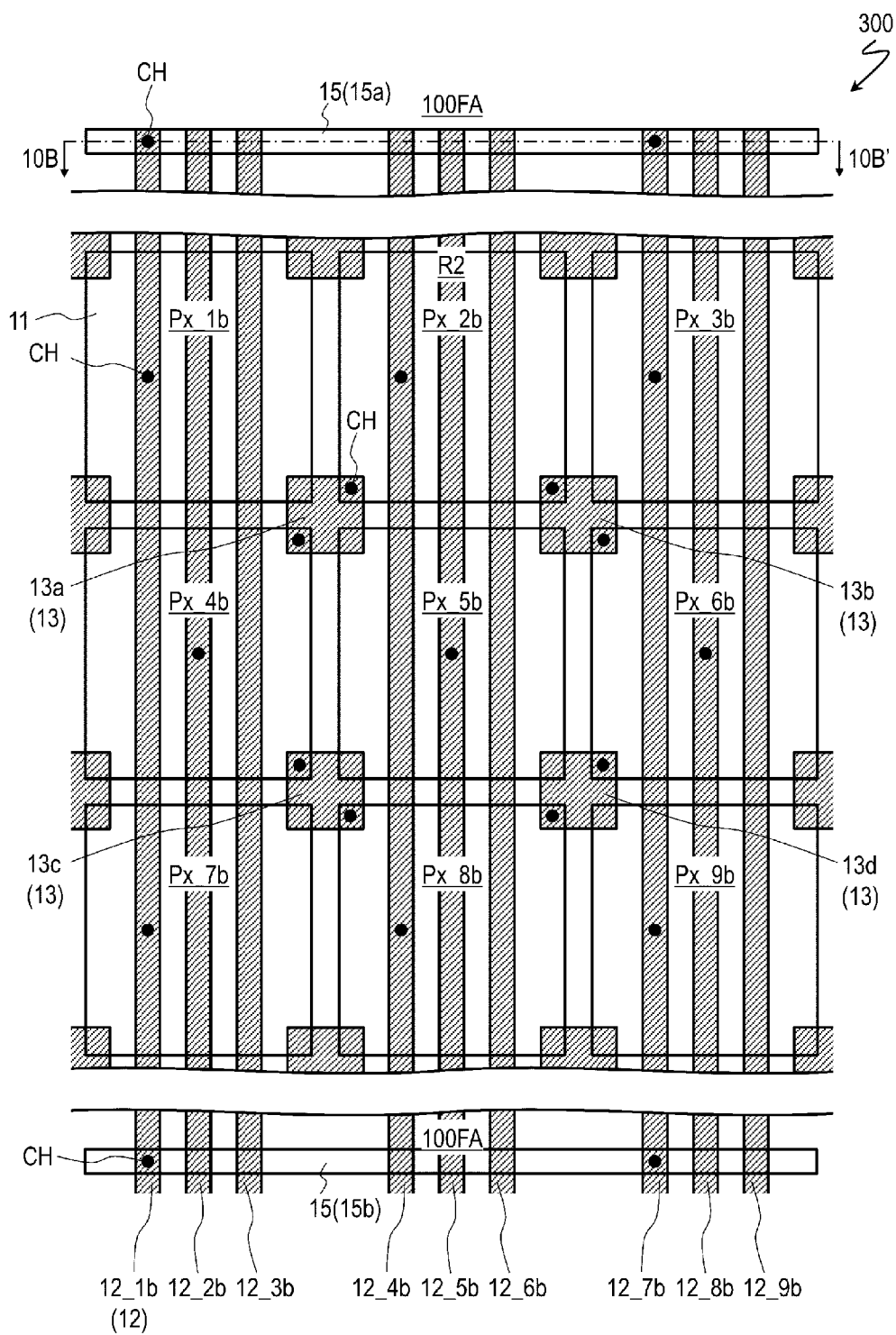
FIG. 10A is a plan view schematically illustrating still another liquid crystal panel 300 according to an embodiment of the disclosure, illustrating an icon display region R2 and a frame region 100FA of the liquid crystal panel 300.

A liquid crystal panel 300 according to the present embodiment will be described with reference to FIGS. 10A and 10B. FIG. 10A is a plan view illustrating an icon display region R2 and a frame region 100FA of the liquid crystal panel 300, and FIG. 10B is a cross-sectional view illustrating the frame region 100FA of the liquid crystal panel 300, illustrating a cross section taken along a line 10B-10B' in FIG. 10A.

Figure 10B:
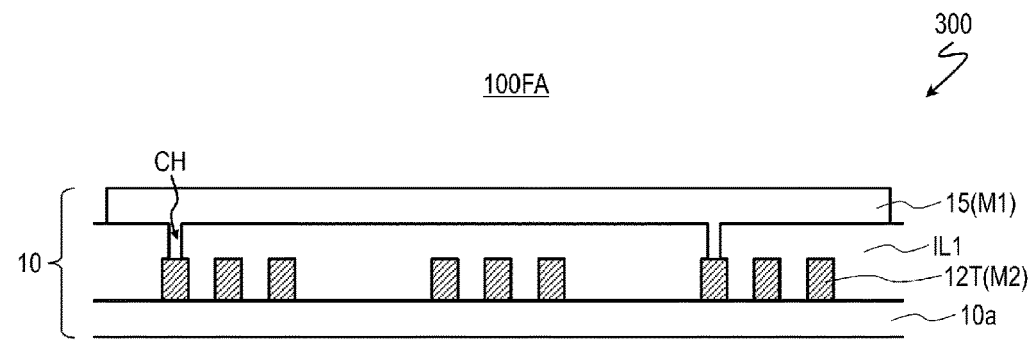
FIG. 10B is a cross-sectional view illustrating the frame region 100FA of the liquid crystal panel 300, illustrating a cross section taken along a line 10B-10B' in FIG. 10A.

The liquid crystal panel 300 in the present embodiment differs from the liquid crystal panel 100 in the first embodiment in that a first substrate 10 includes multiple third connection electrodes 15 formed in the frame region 100FA so as to extend in a row direction (i.e., a direction intersecting a direction in which signal wiring lines 12 extend), as illustrated in FIGS. 10A and 10B.

Each third connection electrode 15 overlaps two or more signal wiring lines 12 when viewed from a normal direction of a substrate plane of the first substrate 10. A third connection electrode 15a located in the frame region 100FA on an upper side overlaps nine signal wiring lines 12_1b to 12_9b in an area illustrated in FIG. 10A. Similarly, a third connection electrode 15b located in the frame region 100FA on a lower side also overlaps the nine signal wiring lines 12_1b to 12_9b in the area illustrated in FIG. 10A.

Here, the third connection electrodes 15 are formed in the same layer as pixel electrodes 11. That is, the third connection electrodes 15 are included in a first conductive layer M1.

Among the nine signal wiring lines 12 illustrated in FIG. 10A, the first signal wiring line 12_1b and the seventh signal wiring line 12_7b are connected to the upper third connection electrode 15a in contact holes CH independently formed in a first insulating layer IL1. The first signal wiring line 12_1b and the seventh signal wiring line 12_7b are also connected to the lower third connection electrode 15b in contact holes CH independently formed in the first insulating layer IL1.

Therefore, the pixel electrodes 11 of a first pixel Px_1b, a third pixel Px_3b, a seventh pixel Px_7b, and a ninth pixel Px_9b are electrically connected to each other via the two signal wiring lines 12_1b and 12_7b and the two third connection electrodes 15a and 15b, and included in one pixel electrode set. In this case, the two signal wiring lines 12_1b and 12_7b are electrically connected to a common pixel drive circuit 50.

As described above, in the liquid crystal panel 300 in the present embodiment, the third connection electrodes 15 are provided in the frame region 100FA, so that the pixel electrodes 11 of two pixels Px adjacent to each other with at least one different pixel Px interposed therebetween in the row direction can be electrically connected to each other, thereby further reducing the total number of the pixel drive circuits 50. For example, while the nine pixels Px illustrated in FIG. 6A are driven by four pixel drive circuits 50, the nine pixels Px illustrated in FIG. 10A can be driven by three pixel drive circuits 50. Note that an arrangement pattern of the pixel electrodes 11 included in the pixel electrode sets is, of course, not limited to that illustrated in FIG. 10A. By adopting a configuration in which the third connection electrodes 15 are provided in the frame region 100FA as in the present embodiment, for example, the icon IC2 as illustrated in FIG. 9 can be displayed with one pixel drive circuit 50.

Note that an example in which two signal wiring lines 12 are connected to one third connection electrode 15 is illustrated here, but three or more signal wiring lines 12 may be connected to one third connection electrode 15. Although the third connection electrodes 15a and 15b are connected to the same two signal wiring lines 12_1b and 12_7b here, at least two signal wiring lines 12 connected to the third connection electrode 15a and at least two signal wiring lines 12 connected to the third connection electrode 15b may be different.

Although an example in which one third connection electrode 15 is provided on each of the upper side and lower side of the frame region 100FA is illustrated here, multiple third connection electrodes 15 may be provided on each of the upper side and lower side of the frame region 100FA. Alternatively, one or more third connection electrodes 15 may be provided only on one of the upper side and lower side of the frame region 100FA.

Although an example is illustrated in which the third connection electrodes 15 are included in the first conductive layer M1 here, the third connection electrodes 15 may be formed in a separate layer from the pixel electrodes 11, and the third connection electrodes 15 may be made of a metal material.

Fourth Embodiment

When displaying white in a liquid crystal panel that operates in a normally black mode in which pixels are arranged in a matrix, alignment of liquid crystal molecules may be disturbed between pixels, resulting in formation of dark lines. When such dark lines are formed between the pixels, spaces between the pixels will be visually recognized as a lattice pattern. A liquid crystal panel 400 according to the present embodiment illustrated in FIGS. 11A to 12C can suppress the formation of dark lines between pixels Px in a white display state by having a configuration described below.

Figure 11A:
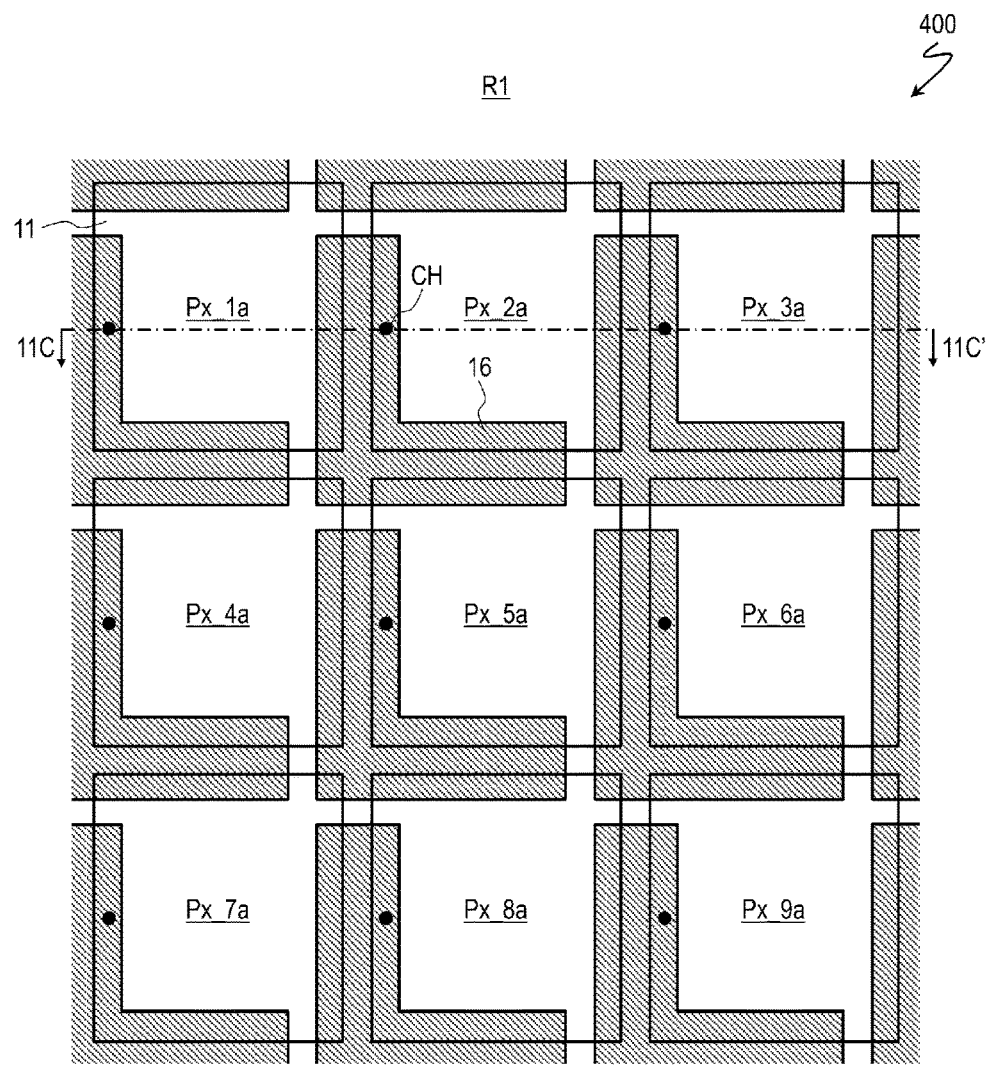
FIG. 11A is a plan view illustrating a matrix display region R1 of yet another liquid crystal panel 400 according to an embodiment of the disclosure, illustrating a region corresponding to nine pixels Px.
Figure 11B:
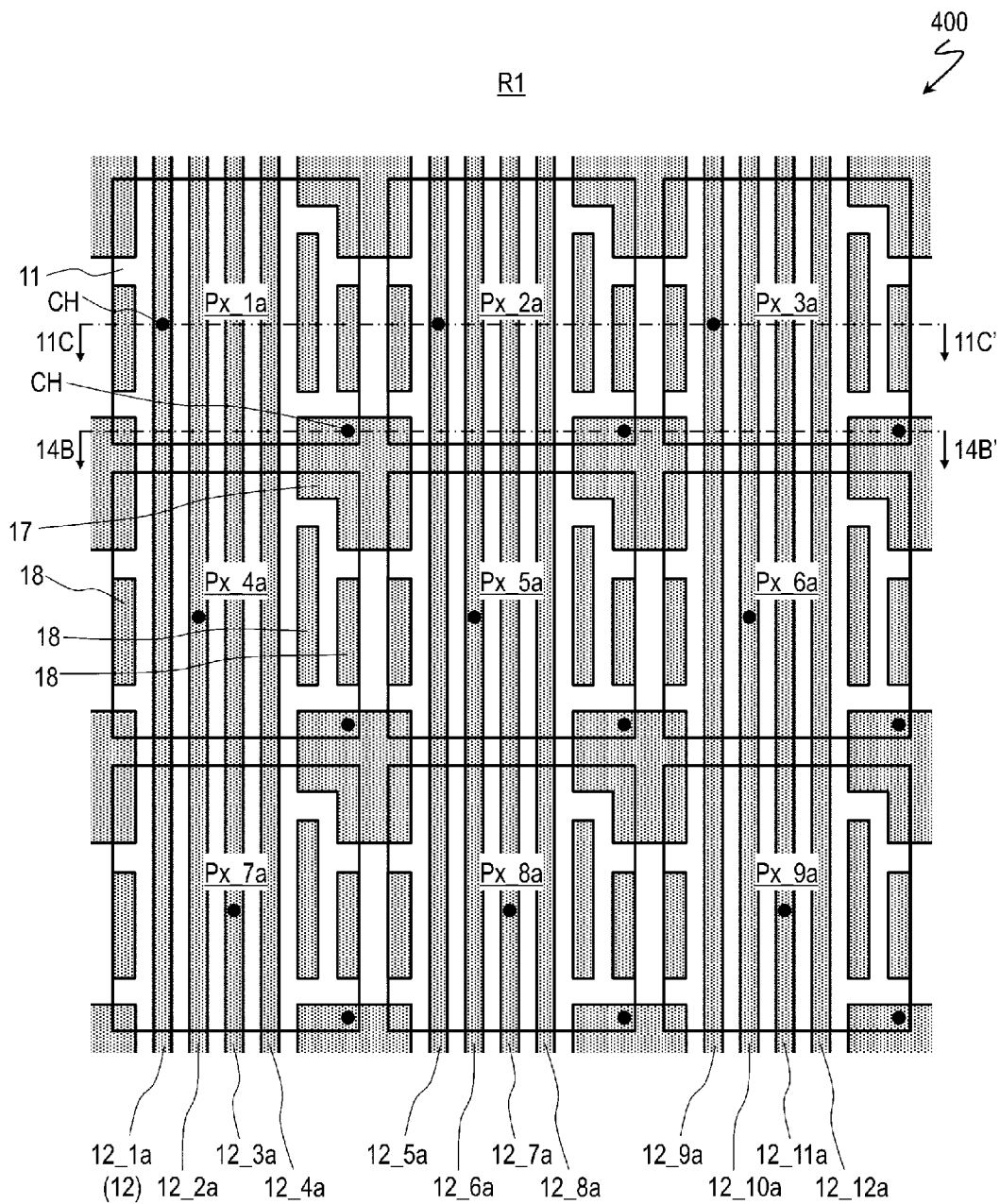
FIG. 11B is a plan view illustrating the matrix display region R1 of the liquid crystal panel 400, illustrating the region corresponding to the nine pixels Px.

First, a configuration in a matrix display region R1 will be described with reference to FIGS. 11A, 11B, and 11C. FIGS. 11A and 11B are plan views illustrating the matrix display region R1 of the liquid crystal panel 400, and FIG. 11C is a cross-sectional view taken along a line 11C-11C' in FIGS. 11A and 11B.

Similar to FIG. 5A, FIGS. 11A and 11B illustrate a region corresponding to nine pixels Px (first pixel Px_1a to ninth pixel Px_9a) arranged in three rows and three columns among a first group of pixels Px. Although FIGS. 11A and 11B illustrate the same region, some components are omitted in each for the sake of clarity. To be specific, a third conductive layer M3 is omitted in FIG. 11A, and a second conductive layer M2 is omitted in FIG. 11B.

Figure 11C:
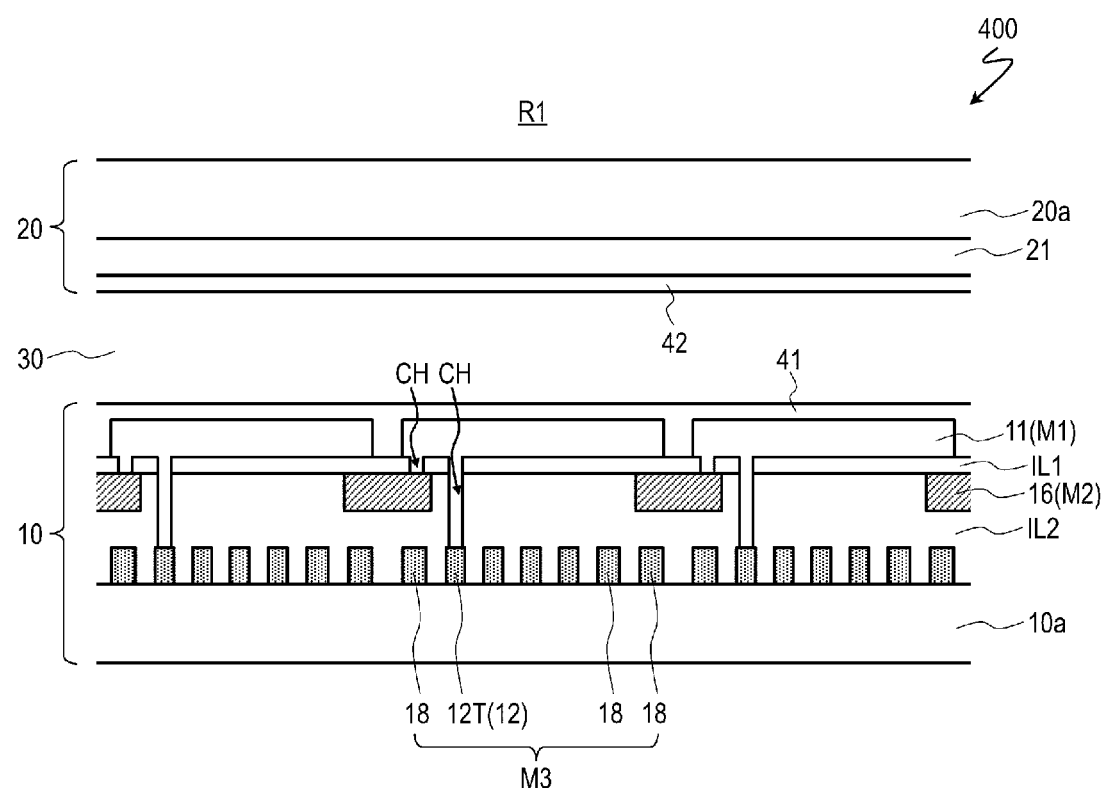
FIG. 11C is a cross-sectional view illustrating the matrix display region R1 of the liquid crystal panel 400, illustrating a cross section taken along a line 11C-11C' in FIGS. 11A and 11B.

As illustrated in FIG. 11C, a first substrate 10 of the liquid crystal panel 400 includes a first conductive layer M1 including multiple pixel electrodes 11, the second conductive layer M2 located below the first conductive layer M1, and a first insulating layer IL1 provided between the first conductive layer M1 and the second conductive layer M2. The first substrate 10 further includes the third conductive layer M3 provided on a side opposite to the first conductive layer M1 with respect to the second conductive layer M2, and a second insulating layer IL2 provided between the third conductive layer M3 and the second conductive layer M2. Note that FIG. 11C illustrates an alignment film 41 provided on a surface of the first substrate 10 on a side closer to a liquid crystal layer 30 and an alignment film 42 provided on a surface of a second substrate 20 on a side closer to the liquid crystal layer 30. The alignment films 41 and 42 are respectively vertical alignment films, and the liquid crystal panel 400 operates in a normally black mode.

As illustrated in FIGS. 11A and 11C, the second conductive layer M2 includes multiple first auxiliary electrodes 16. Each first auxiliary electrode 16 is placed so as to fill a space between two adjacent pixels Px when viewed from a normal direction of a substrate plane of the first substrate 10. The first auxiliary electrode 16 is made of a transparent conductive material (e.g., ITO or IZO), and is electrically connected to one of the two pixel electrodes 11 located in the two adjacent pixels Px (here, the pixel electrode 11 located on an upper right of the first auxiliary electrode 16) in the matrix display region R1. The first auxiliary electrode 16 is connected to the pixel electrode 11 in a contact hole CH formed in the first insulating layer IL1.

In the illustrated example, the first auxiliary electrode 16 includes a portion parallel to a first side (e.g., a side parallel to a row direction) of the square pixel Px and a portion parallel to a second side (e.g., a side parallel to a column direction) of the square pixel Px, and these portions are integrally formed to have an L shape. The first auxiliary electrode 16 overlaps the four pixel electrodes 11 when viewed from a normal direction of a substrate plane of the first substrate 10. Note that the first auxiliary electrode 16 may include only a portion parallel to one side of the pixel Px.

The third conductive layer M3 is made of a transparent conductive material (e.g., ITO or IZO) and includes portions 12T of multiple signal wiring lines 12 located in an active region 100AA. Among 12 signal wiring lines 12 illustrated in FIG. 11B, the signal wiring line 12 located at an n-th position from a left side is referred to as "n-th signal wiring line 12_*na*".

In the matrix display region R1, the multiple pixel electrodes 11 are electrically connected to separate signal wiring lines 12. For example, the pixel electrodes 11 of the first pixel Px_1*a*, the second pixel Px_2*a*, and the third pixel Px_3*a* illustrated in FIG. 11B are electrically connected to a 1st signal wiring line 12_1*a*, a 5th signal wiring line 12_5*a*, and a 9th signal wiring line 12_9*a*, respectively. The pixel electrodes 11 of the fourth pixel Px_4*a*, the fifth pixel Px_5*a*, and the sixth pixel Px_6*a* are electrically connected to a 2nd signal wiring line 12_2*a*, a 6th signal wiring line 12_6*a*, and a 10th signal wiring line 12_10*a*, respectively, and the pixel electrodes 11 of the seventh pixel Px_7*a*, the eighth pixel Px_8*a*, and the ninth pixel Px_9*a* are electrically connected to a 3rd signal wiring line 12_3*a*, a 7th signal wiring line 12_7*a*, and an 11th signal wiring line 12_11*a*, respectively. The 1st to 12th signal wiring lines 12_1*a* to 12_12*a* are connected to separate pixel drive circuits 50 in a frame region 100FA.

The third conductive layer M3 further includes multiple second auxiliary electrodes 17 and multiple dummy wiring lines 18. Each second auxiliary electrode 17 is placed so as to fill a space between two adjacent pixels Px when viewed from the normal direction of the substrate plane of the first substrate 10 and is electrically connected to one of the two pixel electrodes 11 located in the two adjacent pixels Px. The second auxiliary electrode 17 is connected to the first auxiliary electrode 16 in a contact hole CH formed in the second insulating layer IL2 and is electrically connected to the pixel electrode 11 via the first auxiliary electrode 16. Each second auxiliary electrode 17 includes a portion that does not overlap the first auxiliary electrode 16 when viewed from the normal direction of the substrate plane of the first substrate 10. That is, the second auxiliary electrode 17 fills a space between two adjacent pixels Px that is not filled with the first auxiliary electrode 16. In the illustrated example, the second auxiliary electrode 17 has an L shape and overlaps the four pixel electrodes 11 when viewed from the normal direction of the substrate plane of the first substrate 10.

In the illustrated example, the multiple dummy wiring lines 18 are not electrically connected to the pixel drive circuit 50 or the pixel electrode 11 and are in an electrically floating state. Each dummy wiring line 18 extends in the same direction as the signal wiring line 12 and may have substantially the same width as the signal wiring line 12. Note that each dummy wiring line 18 may be connected to the auxiliary electrode 17.

The above-described configuration enables matrix display with one pixel Px as a minimum unit in the matrix display region R1.

Figure 12A:
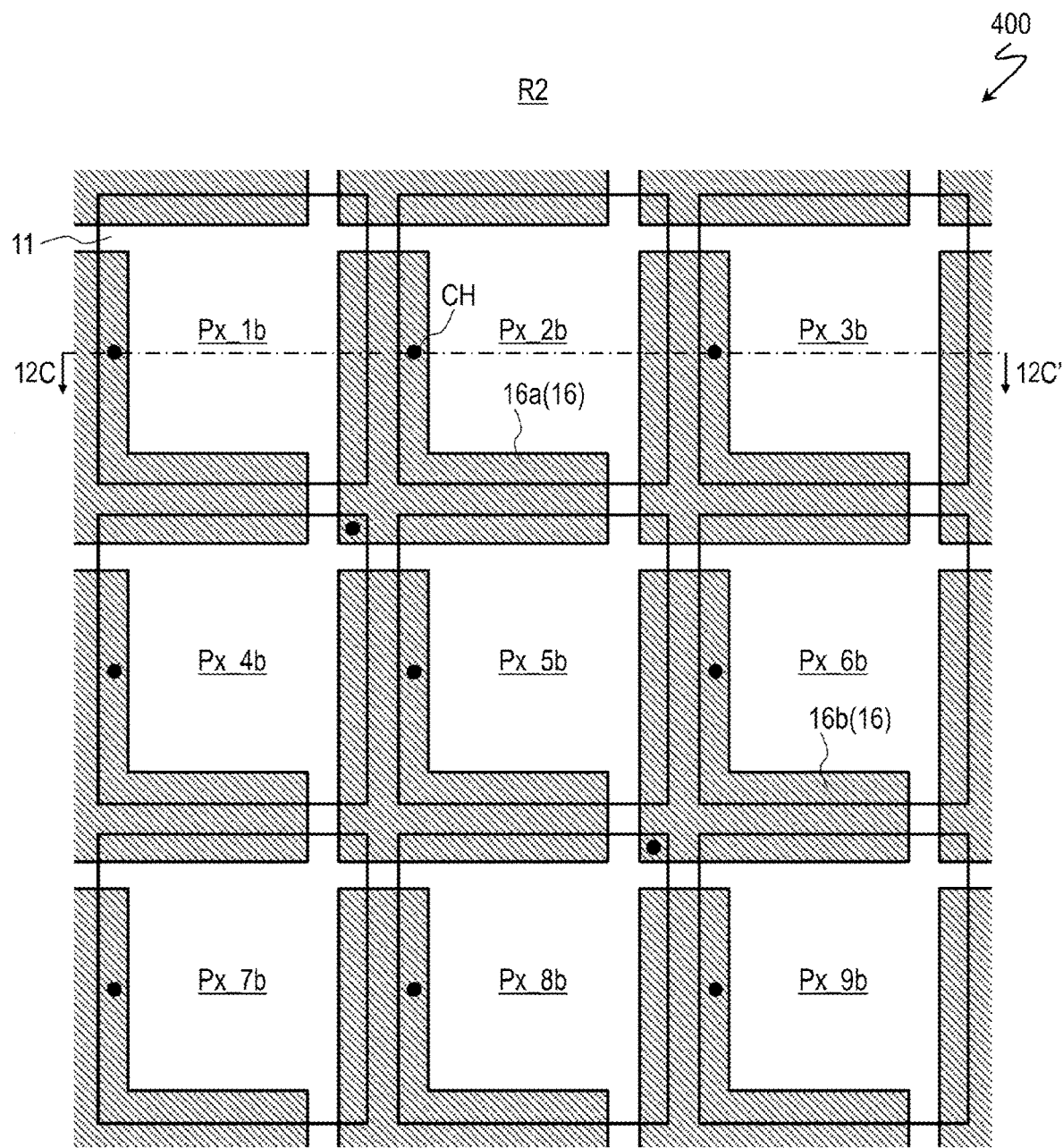
FIG. 12A is a plan view illustrating an icon display region R2 of the liquid crystal panel 400, illustrating a region corresponding to nine pixels Px.
Figure 12B:
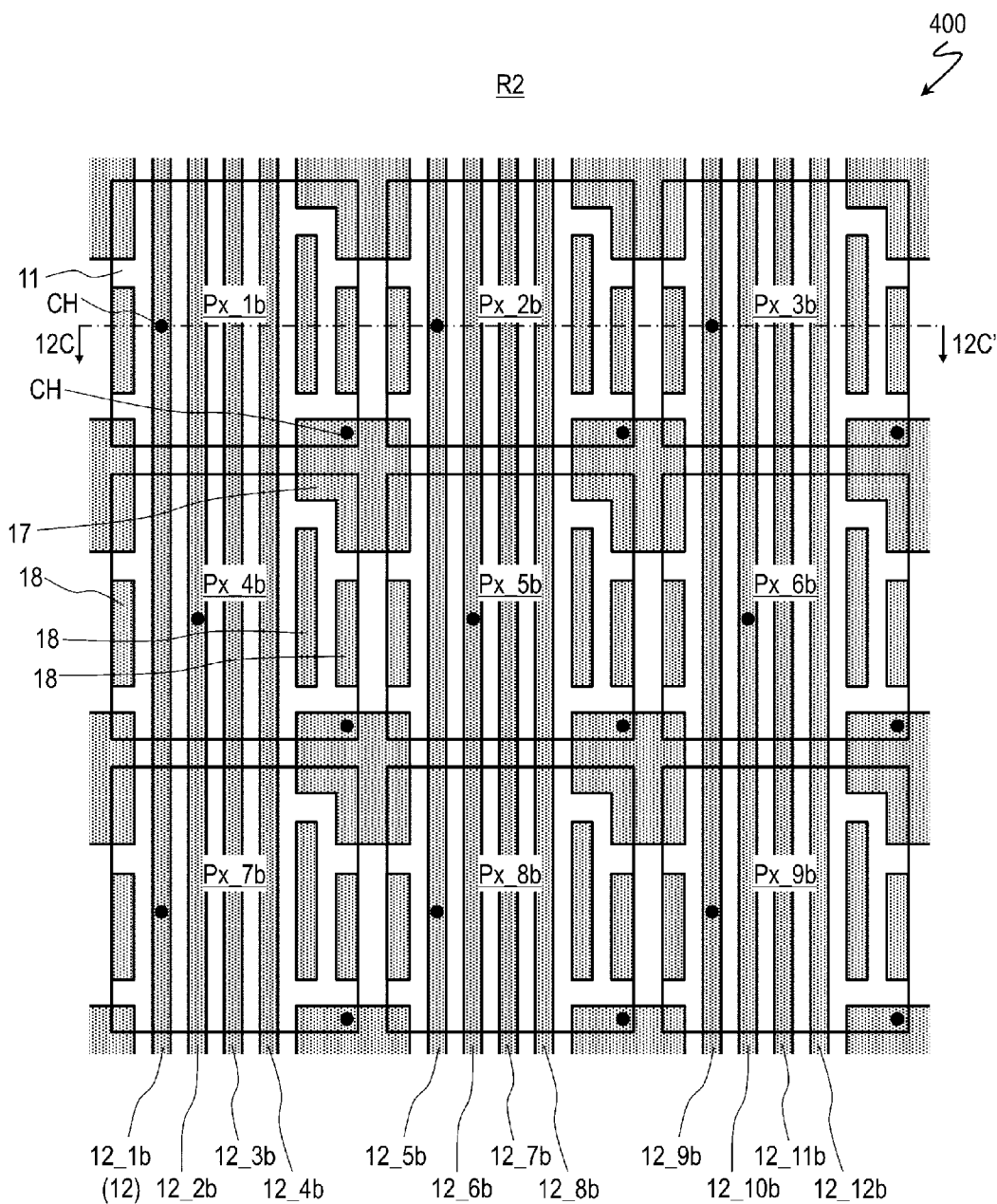
FIG. 12B is a plan view illustrating the icon display region R2 of the liquid crystal panel 400, illustrating the region corresponding to the nine pixels Px.

Next, a configuration in an icon display region R2 will be described with reference to FIGS. 12A, 12B, and 12C. FIGS. 12A and 12B are plan views illustrating the icon display region R2 of the liquid crystal panel 400, and FIG. 12C is a cross-sectional view taken along a line 12C-12C' in FIGS. 12A and 12B.

Similar to FIG. 6A, FIGS. 12A and 12B illustrate a region corresponding to nine pixels Px (first pixel Px_1*b* to ninth pixel Px_9*b*) arranged in three rows and three columns among a second group of pixels Px. Similar to FIG. 11A, the third conductive layer M3 is omitted in FIG. 12A, and similar to FIG. 11B, the second conductive layer M2 is omitted in FIG. 12B.

Figure 12C:
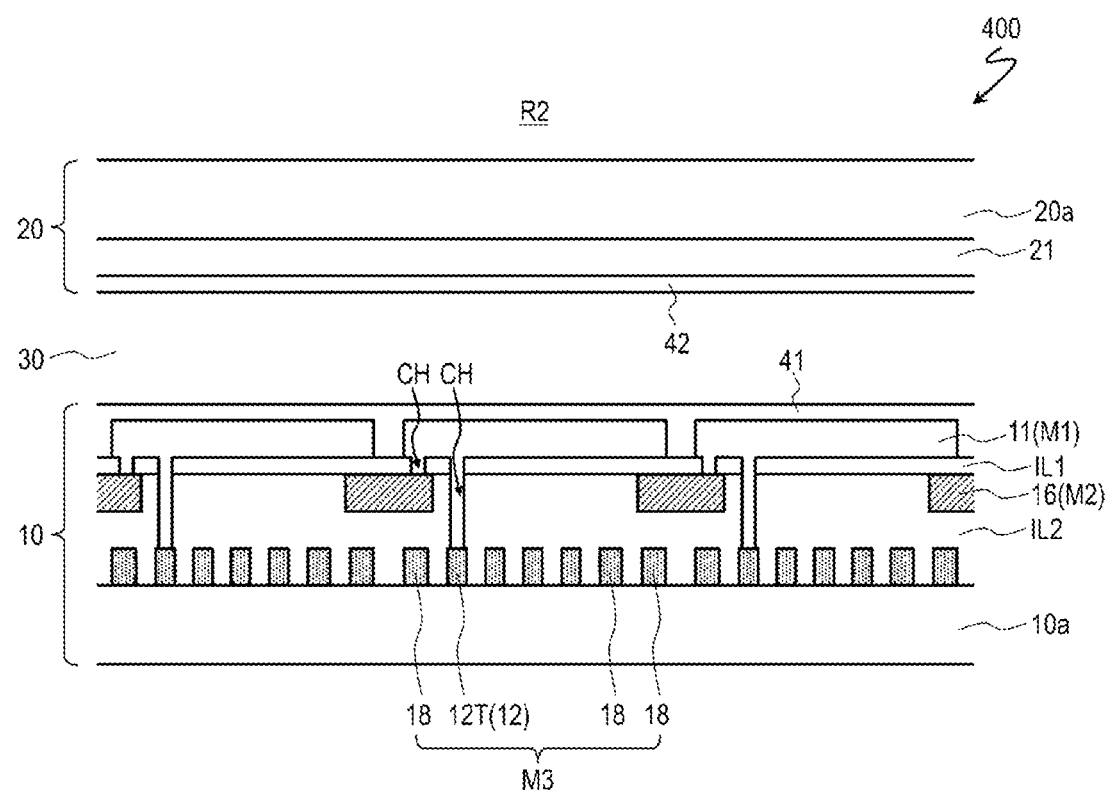
FIG. 12C is a cross-sectional view illustrating the icon display region R2 of the liquid crystal panel 400, illustrating a cross section taken along a line 12C-12C' in FIGS. 12A and 12B.

As illustrated in FIG. 12C, also in the icon display region R2, the first substrate 10 includes the first conductive layer M1, the second conductive layer M2, the third conductive layer M3, the first insulating layer IL1, and the second insulating layer IL2. The second conductive layer M2 includes multiple first auxiliary electrodes 16, and the third conductive layer M3 includes portions 12T of multiple signal wiring lines 12 located in the active region 100AA, multiple second auxiliary electrodes 17, and multiple dummy wiring lines 18. Note that among the 12 signal wiring lines 12 illustrated in FIG. 12B, the signal wiring line 12 located at an n-th position from a left side is referred to as "n-th signal wiring line 12_*nb*".

The multiple pixel electrodes 11 located in the icon display region R2 include at least one pixel electrode set including two or more pixel electrodes 11 electrically connected to each other.

For example, among the nine pixel electrodes 11 illustrated in FIGS. 12A and 12B, the pixel electrodes 11 of the first pixel Px_1*b* and the seventh pixel Px_7*b* are electrically connected to each other and included in a "first pixel electrode set". The pixel electrodes 11 of the second pixel Px_2*b*, the fourth pixel Px_4*b*, the sixth pixel Px_6*b*, and the eighth pixel Px_8*b* are electrically connected to each other and included in a "second pixel electrode set". The pixel electrodes 11 of the third pixel Px_3*b* and the ninth pixel Px_9*b* are electrically connected to each other and included in a "third pixel electrode set".

The two pixel electrodes 11 included in the first pixel electrode set (i.e., the first pixel Px_1*b* and the seventh pixel Px_7*b*) are connected to a 1st signal wiring line 12_1*b* in contact holes CH independently formed in a layered body of the first insulating layer IL1 and the second insulating layer IL2. Therefore, the pixel electrodes 11 of the first pixel Px_1*b* and the seventh pixel Px_7*b* are electrically connected to each other via the 1st signal wiring line 12_1*b*, and a signal voltage is applied to the pixel electrodes 11 of the first pixel Px_1*b* and the seventh pixel Px_7*b* from a common pixel drive circuit 50.

Similarly, the two pixel electrodes 11 included in the third pixel electrode set (i.e., the third pixel Px_3*b* and the ninth pixel Px_9*b*) are connected to a 9th signal wiring line 12_9*b* in contact holes CH independently formed in the layered body of the first insulating layer IL1 and the second insulating layer IL2. Therefore, the pixel electrodes 11 of the third pixel Px_3*b* and the ninth pixel Px_9*b* are electrically connected to each other via the 9th signal wiring line 12_9*b*, and a signal voltage is applied to the third pixel Px_3*b* and the ninth pixel Px_9*b* from a common pixel drive circuit 50.

Among the four pixel electrodes 11 included in the second pixel electrode set, the pixel electrodes 11 of the second pixel Px_2b and the fourth pixel Px_4b are connected to a first auxiliary electrode 16a located at the upper left of the fifth pixel Px_5b in contact holes CH independently formed in the first insulating layer IL1. Similarly, the pixel electrodes 11 of the sixth pixel Px_6b and the eighth pixel Px_8b are connected to a first auxiliary electrode 16b located on a lower right side of the fifth pixel Px_5b in contact holes CH independently formed in the first insulating layer IL1. The pixel electrodes 11 of the second pixel Px_2b and the eighth pixel Px_8b are electrically connected to a 5th signal wiring line 12_5b. Therefore, the four pixel electrodes 11 included in the second pixel electrode set (i.e., the second pixel Px_2b, the fourth pixel Px_4b, the sixth pixel Px_6b, and the eighth pixel Px_8b) are electrically connected to each other via two first auxiliary electrodes 16 and one signal wiring line 12.

The pixel electrode 11 of the fourth pixel Px_4b is electrically connected to a 2nd signal wiring line 12_2b, and the pixel electrode 11 of the sixth pixel Px_6b is electrically connected to a 10th signal wiring line 12_10b. The 2nd signal wiring line 12_2b, the 5th signal wiring line 12_5b, and the 10th signal wiring line 12_10b are electrically connected to a common pixel drive circuit 50, and a signal voltage is applied to the pixel electrodes 11 of the second pixel Px_2b, the fourth pixel Px_4b, the sixth pixel Px_6b, and the eighth pixel Px_8b from the common pixel drive circuit 50. Note that the four pixel electrodes 11 included in the second pixel electrode set only need to be electrically connected to each other, and as long as the four pixel electrodes 11 are electrically connected to each other, some of the connection relationships described above may be omitted.

The pixel electrode 11 of the fifth pixel Px_5b is not electrically connected to the other pixel electrodes 11. The pixel electrode 11 of the fifth pixel Px_5b is electrically connected to a 6th signal wiring line 12_6b, and a signal voltage is applied from a corresponding pixel drive circuit 50 via the 6th signal wiring line 12_6b.

With such a configuration, desired display can be achieved in the icon display region R2 with a relatively small number of pixel drive circuits 50. For example, in the matrix display region R1, nine pixel drive circuits 50 are required to drive the nine pixels Px illustrated in FIGS. 11A and 11B, whereas in the icon display region R2, the nine pixels Px illustrated in FIGS. 12A and 12B can be driven by four pixel drive circuits 50. An arrangement pattern of the pixel electrodes 11 included in the pixel electrode sets in the icon display region R2 is, of course, not limited to that illustrated in FIGS. 12A and 12B. In the icon display region R2, for example, an icon such as the icon IC1 illustrated in FIG. 7 can be displayed with one pixel drive circuit 50.

As described above, in the liquid crystal panel 400 in the present embodiment, the multiple pixel drive circuits 50 are located in the frame region 100FA, so that transmittance can be improved and higher transmittance than known liquid crystal panels can be achieved. In addition, in the liquid crystal panel 400 in the present embodiment, the pixel electrodes 11 located in the second display region (icon display region) R2 include the pixel electrode sets including two or more pixel electrodes 11 electrically connected to each other, the total number of pixel drive circuits 50 arranged in the frame region 100FA can be reduced. Therefore, an increase in an area of the frame region 100FA can be suppressed.

Further, in the liquid crystal panel 400 in the present embodiment, the first auxiliary electrode 16 located so as to fill the space between two adjacent pixels Px is electrically connected to at least one of the two pixel electrodes 11 of the two pixels Px. Therefore, the same voltage that is supplied to one or both of the two pixel electrodes 11 is supplied to the first auxiliary electrode 16, so that alignment of the liquid crystal molecules between the two adjacent pixels Px can be easily aligned with alignment of the liquid crystal molecules in one or both pixels Px. Thus, the formation of dark lines between the two adjacent pixels Px can be suppressed.

Note that an example in which one or two pixel electrodes 11 are connected to one first auxiliary electrode 16 in the icon display region R2 is illustrated here, but three or more pixel electrodes 11 may be connected to one first auxiliary electrode 16. In the illustrated example, each first auxiliary electrode 16 overlaps four pixel electrodes 11 arranged in two rows and two columns, and up to four pixel electrodes 11 can be connected to one first auxiliary electrode 16.

In the liquid crystal panel 400 in the present embodiment, the second auxiliary electrode 17 is located so as to fill the space between the two adjacent pixels Px and is electrically connected to one of the two pixel electrodes 11 of the two pixels Px. The second auxiliary electrode 17 fills the space between the two adjacent pixels Px that is not filled with the first auxiliary electrode 16, thereby increasing an effect of suppressing the formation of the dark lines.

Note that the second auxiliary electrode 17 in the icon display region R2 may be used to electrically connect two or more pixel electrodes 11. That is, the pixel electrode set may include two or more pixel electrodes 11 electrically connected to each other via the second auxiliary electrode 17.

From the viewpoint of improving the transmittance of the liquid crystal panel 400, it is preferable that not only the pixel electrodes 11 and the common electrode 21 be made of a transparent conductive material but also the second conductive layer M2 and the third conductive layer M3 be made of a transparent conductive material, as exemplified in the present embodiment.

In addition, as exemplified in the present embodiment, the third conductive layer M3 includes the multiple dummy wiring lines 18, which makes the dense areas and sparse areas in the third conductive layer M3 to be less visually recognizable.

Figure 13A:
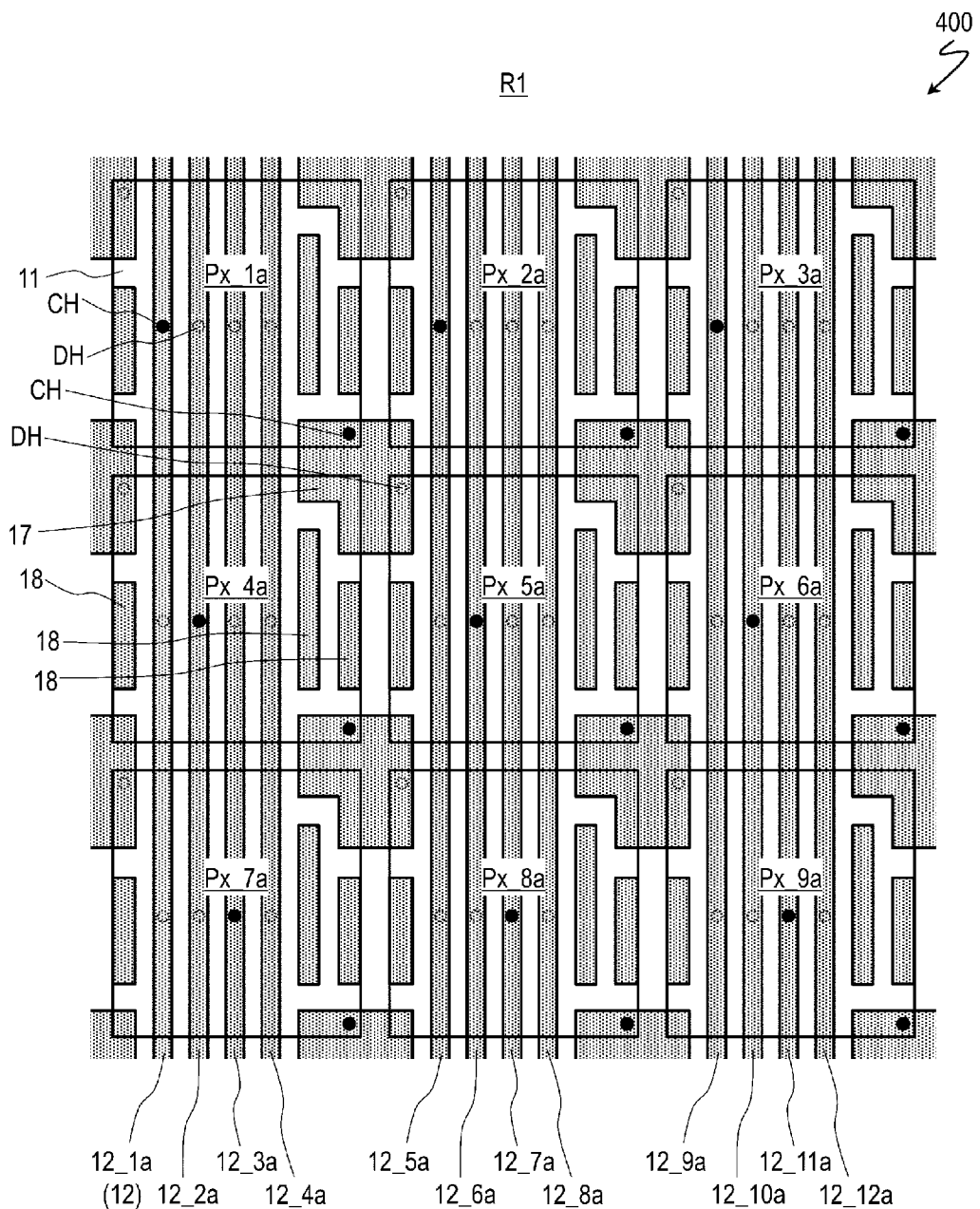
FIG. 13A is a plan view illustrating a modified example of the liquid crystal panel 400, illustrating the matrix display region R1 of the liquid crystal panel 400.
Figure 13B:
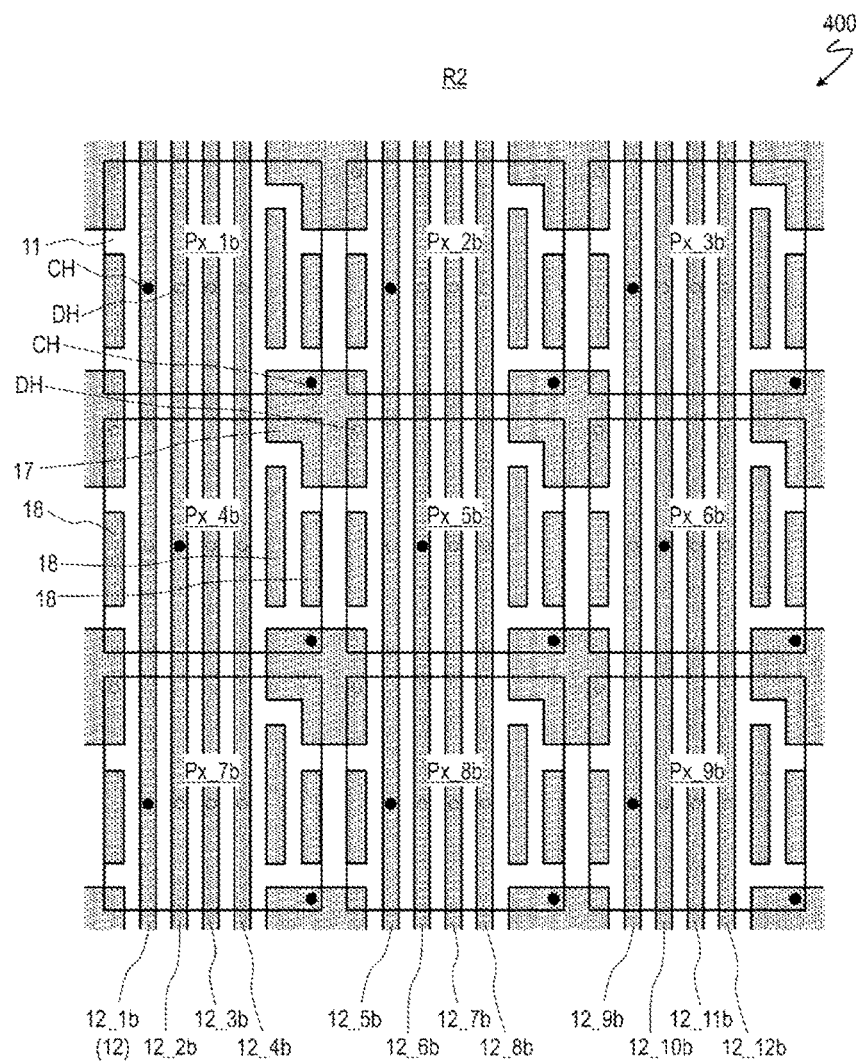
FIG. 13B is a plan view illustrating the modified example of the liquid crystal panel 400, illustrating the icon display region R2 of the liquid crystal panel 400.

FIGS. 13A and 13B illustrate a modified example of the liquid crystal panel 400. Similar to FIGS. 11B and 12B, FIGS. 13A and 13B are plan views illustrating the matrix display region R1 and the icon display region R2 of the liquid crystal panel 400, respectively.

Figure 13C:
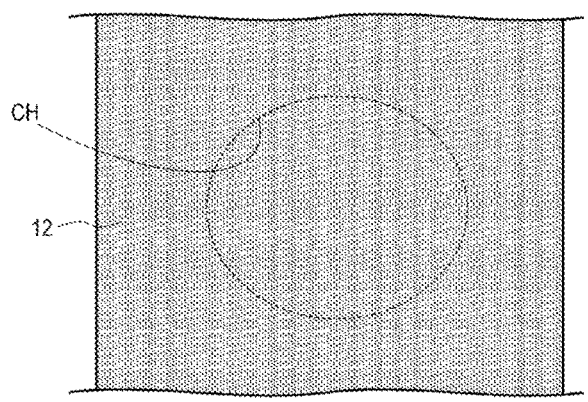
FIG. 13C is an enlarged plan view illustrating a contact hole CH placed so as to overlap a signal wiring line 12 and the vicinity thereof.

In the example illustrated in FIGS. 13A and 13B, the second insulating layer IL2 has multiple dummy contact holes DH formed in regions overlapping the pixel electrodes 11. Each dummy contact hole DH is located so as to overlap the signal wiring line 12 or the second auxiliary electrode 17. Although the dummy contact hole DH is an opening formed in the second insulating layer IL2, the third conductive layer M3 is not electrically connected to another conductive layer in the dummy contact hole DH. FIG. 13C illustrates an enlarged view of the contact hole CH located so as to overlap the signal wiring line 12 and the vicinity thereof, and FIG. 13D illustrates the dummy contact hole DH located so as to overlap the signal wiring line 12 and the vicinity thereof.

Figure 13D:
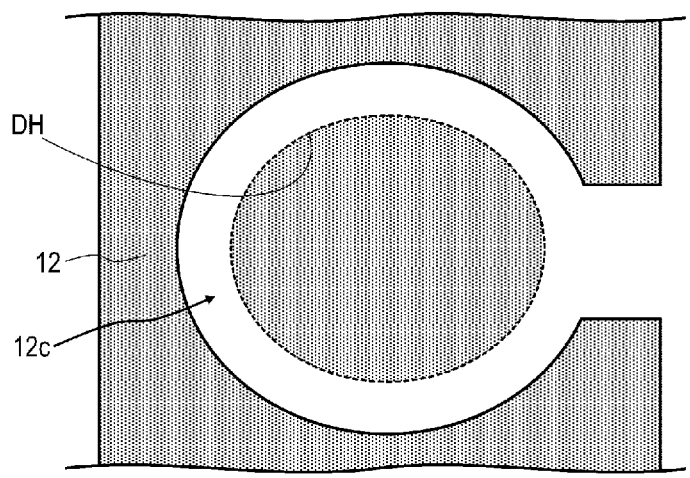
FIG. 13D is an enlarged plan view illustrating a dummy contact hole DH placed so as to overlap a signal wiring line 12 and the vicinity thereof.

In the vicinity of the dummy contact hole DH illustrated in FIG. 13D, unlike the vicinity of the contact hole illustrated in FIG. 13C, a cut-out portion 12c is formed in the signal wiring line 12 so as to surround the dummy contact hole DH (opening portion in the second insulating layer IL2), whereby the signal wiring line 12 is insulated from the pixel electrode 11 above the signal wiring line 12. Although not illustrated here, in the vicinity of the dummy contact hole DH located so as to overlap the second auxiliary electrode 17, a cut-out portion is similarly formed in the second auxiliary electrode 17.

When a relatively thick organic insulating layer that functions as a flattening film is used as the second insulating layer IL2, the contact hole CH formed in the second insulating layer IL2 is a relatively deep hole. Therefore, sparse areas due to the contact holes CH in the active region 100AA may cause variations in thickness of the alignment film 41, which may lead to a decrease in display quality. As illustrated in FIGS. 13A and 13B, by forming the dummy contact holes DH in the second insulating layer IL2, the variations in the thickness of the alignment film 41 can be suppressed.

Note that a similar effect can also be obtained by forming dummy contact holes overlapping the pixel electrodes 11 (more specifically, also overlapping the second connection electrodes 14) in the second insulating layer IL2 of the liquid crystal panel 200 in the second embodiment.

Figure 14A:
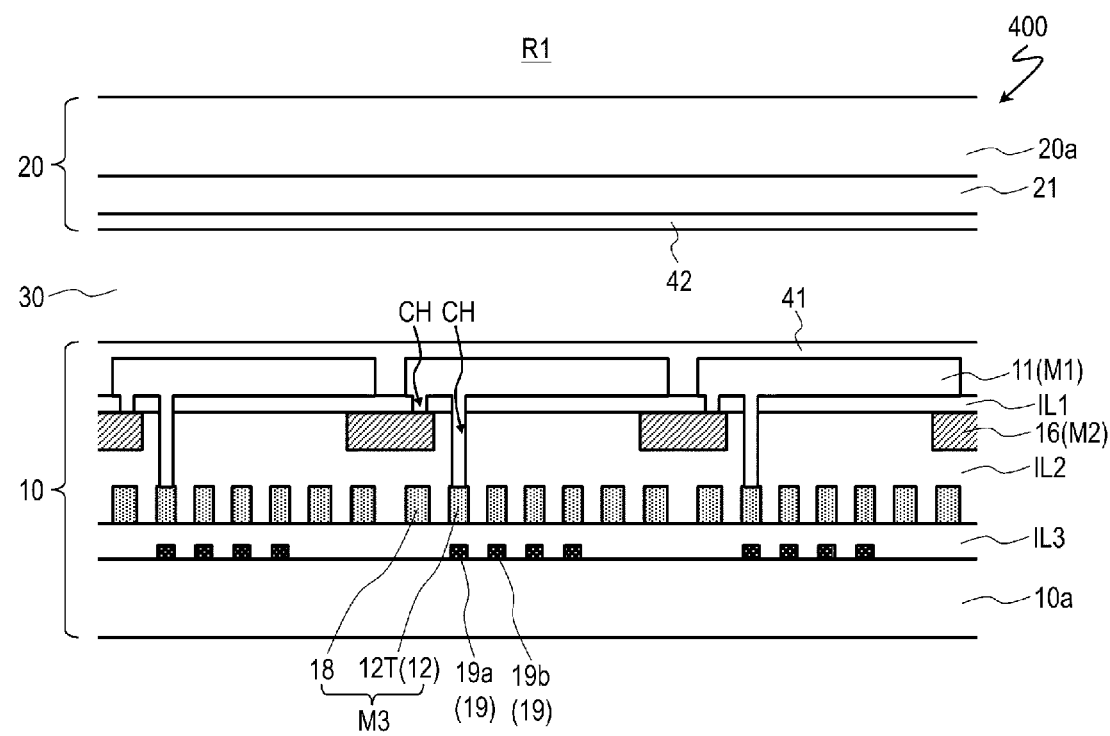
FIG. 14A is a cross-sectional view illustrating another modified example of the liquid crystal panel 400, illustrating a cross section taken along a line 11C-11C' in FIG. 11B.
Figure 14B:
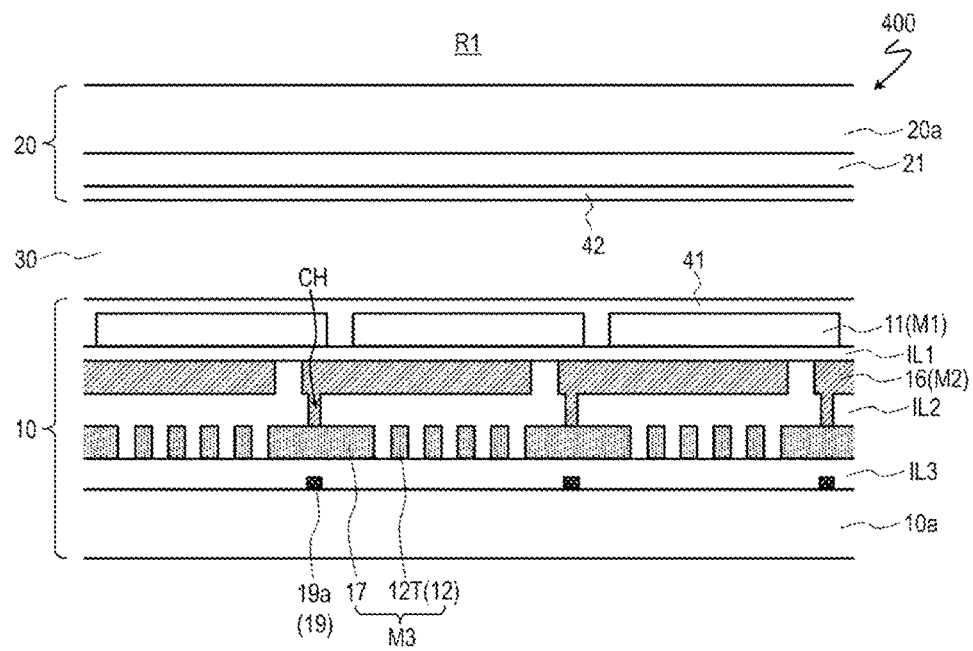
FIG. 14B is a cross-sectional view illustrating the other modified example of the liquid crystal panel 400, illustrating a cross section taken along a line 14B-14B' in FIG. 11B.

FIGS. 14A and 14B illustrate another modified example of the liquid crystal panel 400. FIGS. 14A and 14B are cross-sectional views illustrating the matrix display region R1 of the liquid crystal panel 400, illustrating cross sections taken along lines 11C-11C' and 14B-14B' in FIG. 11B, respectively.

In the example illustrated in FIGS. 14A and 14B, the first substrate 10 includes multiple light blocking layers 19. The multiple light blocking layers 19 are located below the third conductive layer M3 and covered with a third insulating layer IL3. The multiple light blocking layers 19 are made of a metal material and can be formed in the same layer as wiring lines and electrodes of the pixel drive circuits 50.

The multiple light blocking layers 19 include light blocking layers 19a that block light from entering contact holes CH formed in the second insulating layer IL2 and light blocking layers 19b that do not overlap the contact holes CH formed in the second insulating layer IL2. Each of the latter light blocking layers 19b blocks light from entering a region corresponding to the dummy contact hole DH in the example illustrated in FIGS. 13A and 13B (a region overlapping the signal wiring line 12 or the second auxiliary electrode 17 but not overlapping the contact hole CH). The provision of such light blocking layers 19 can also suppress a decrease in the display quality caused by variations in the thickness of the alignment film 41.

Fifth Embodiment

Figure 15A:
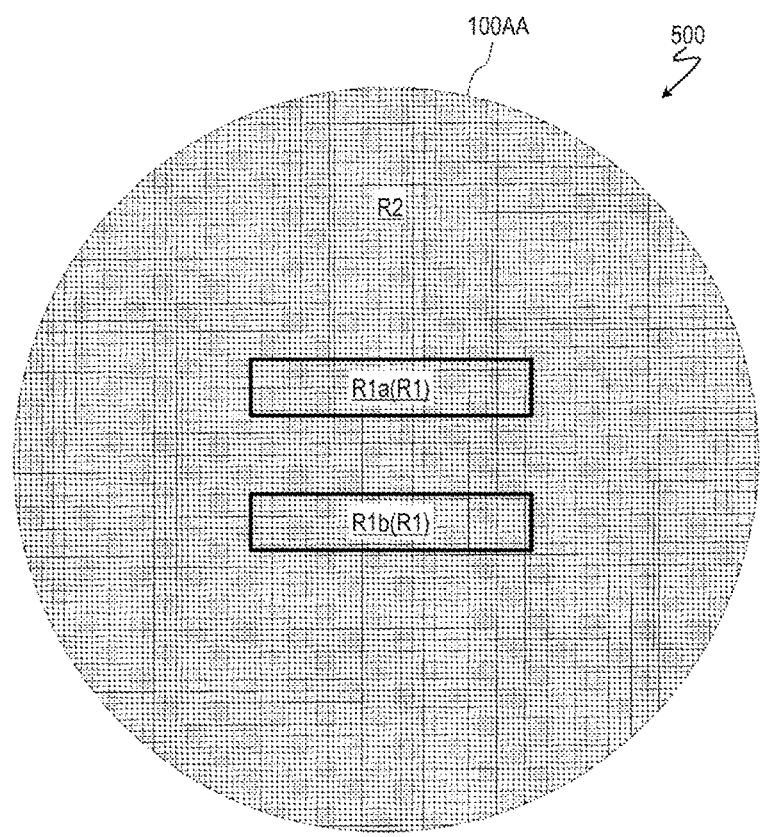
FIG. 15A is a plan view illustrating an entire active region 100AA of further liquid crystal panel 500 according to an embodiment of the disclosure.
Figure 15B:
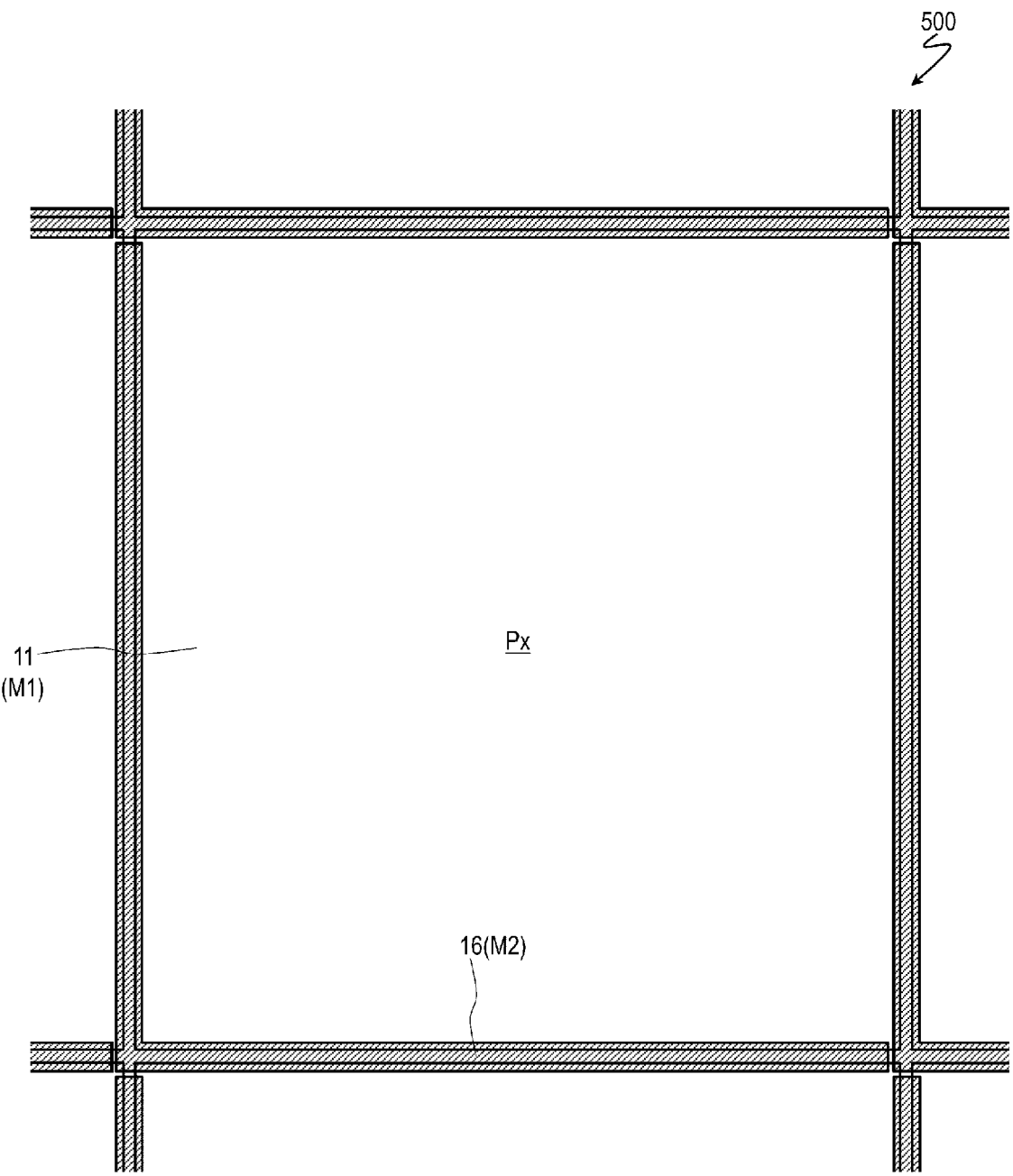
FIG. 15B is a plan view illustrating a region corresponding to one pixel Px of the liquid crystal panel 500.
Figure 15C:
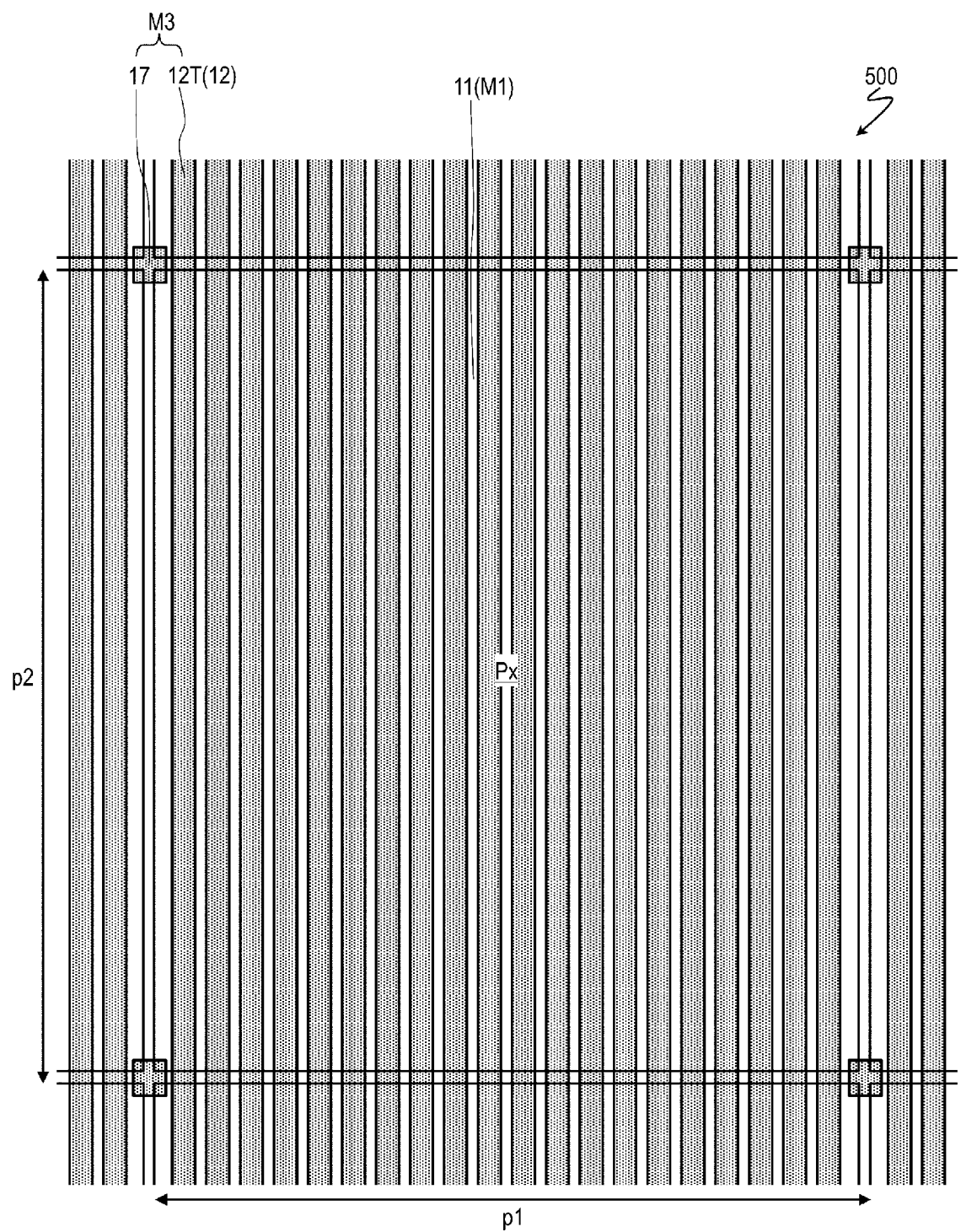
FIG. 15C is a plan view illustrating the region corresponding to the one pixel Px of the liquid crystal panel 500.

A liquid crystal panel 500 according to the present embodiment will be described with reference to FIGS. 15A, 15B, and 15C. FIG. 15A is a plan view illustrating an entire active region 100AA of the liquid crystal panel 500. FIGS. 15B and 15C are plan views illustrating a region corresponding to one pixel Px of the liquid crystal panel 500. In FIG. 15B, a third conductive layer M3 is omitted, and in FIG. 15C, a second conductive layer M2 is omitted. In FIGS. 15B and 15C, illustration of a contact hole CH is also omitted.

As illustrated in FIG. 15A, the active region 100AA of the liquid crystal panel 500 has a circular shape. Here, the number of pixels Px included in the active region 100AA is 10000 (=100×100). Each pixel Px is in a transmitting state when no voltage is applied to a liquid crystal layer 30.

A first display region R1 of the active region 100AA includes a first portion R1a and a second portion R1b each having a rectangular shape. Each of the first portion R1a and the second portion R1b includes pixels Px in 10 rows and 50 columns. That is, the number of pixels of each of the first portion R1a and the second portion R1b is 500.

The liquid crystal panel 500 includes a first conductive layer M1 including multiple pixel electrodes 11 and the second conductive layer M2 including multiple first auxiliary electrodes 16, as illustrated in FIG. 15B. The liquid crystal panel 500 also includes the third conductive layer M3 including portions 12T of multiple signal wiring lines 12 located in the active region 100AA and multiple second auxiliary electrodes 17, as illustrated in FIG. 15C.

In the first display region R1, the pixel electrodes 11 of the pixels Px are electrically connected to corresponding pixel drive circuits 50 in a frame region 100FA via separate signal wiring lines 12. On the other hand, in a second display region R2, the pixel electrodes 11 of all the pixels Px are electrically connected to each other via first auxiliary electrodes 16 and signal wiring lines 12. However, the pixel electrodes 11 in the second display region R2 are not connected to the pixel drive circuit 50, and the same potential as a counter electrode 21 is always applied to the pixel electrodes 11 in the second display region R2. In other words, substantially no voltage is applied to a liquid crystal layer 30 of each pixel Px in the second display region R2, and each pixel Px in the second display region R2 is always in a transmitting state. In this case, although the number of pixels in the entire active region 100AA is 10000, the total number of pixel drive circuits 50 can be reduced to 1000. In addition, since only the first display region R1 contributes to power consumption, low power consumption is also possible.

Here, when a diameter of the active region 100AA is 36 mm, a pixel pitch p1 in a row direction and a pixel pitch p2 in a column direction (see FIG. 15C) are each 0.36 mm. In order to connect the pixels Px in the first display region R1 to the pixel drive circuits 50 located above the active region 100AA, 20 signal wiring lines 12 are arranged per pixel column.

Figure 15D:
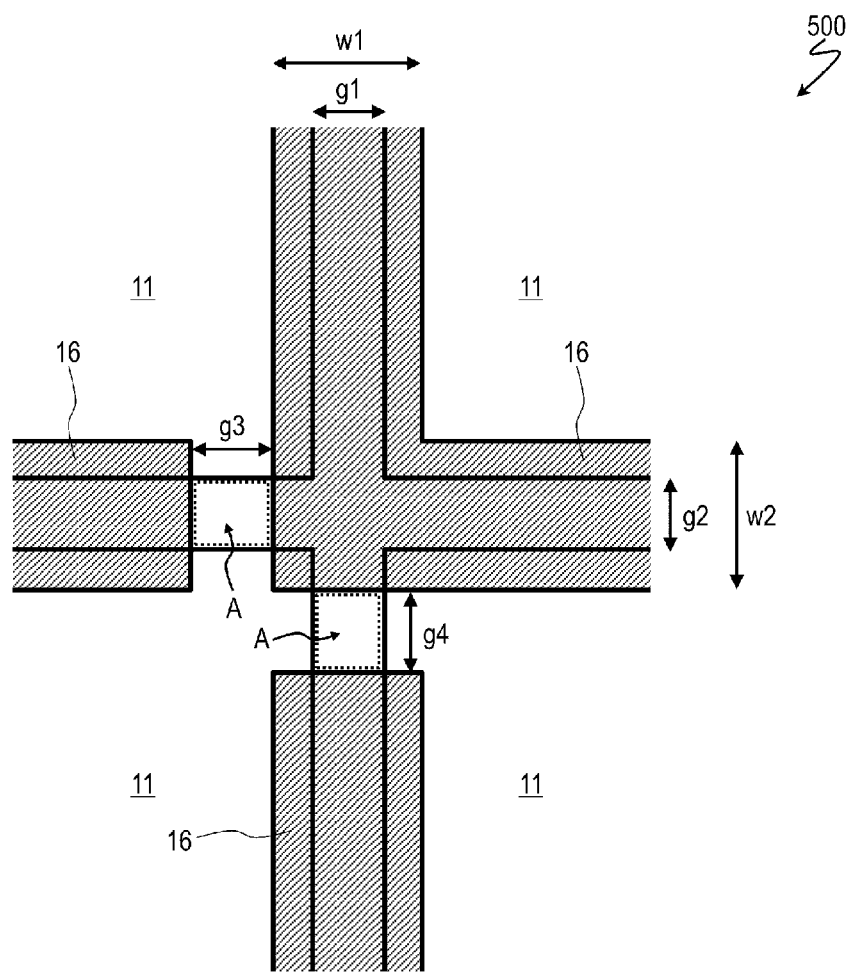
FIG. 15D is an enlarged view illustrating corners of the pixels Px of the liquid crystal panel 500 and the vicinities thereof.
Figure 15E:
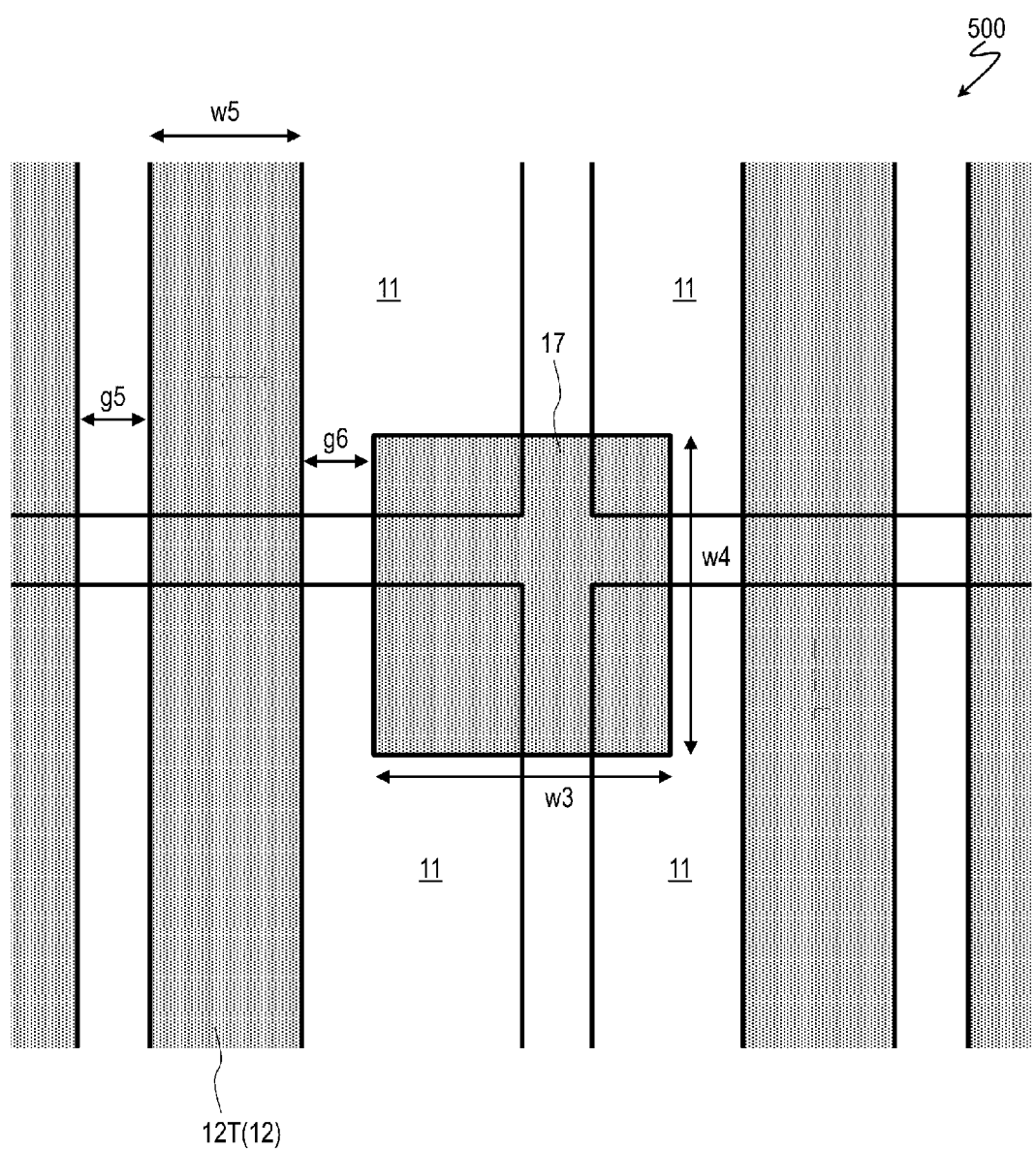
FIG. 15E is an enlarged view illustrating the corners of the pixel Px of the liquid crystal panel 500 and the vicinities thereof.

FIGS. 15D and 15E are enlarged views of corners of the pixels Px and vicinities thereof. When a space g1 between two adjacent pixel electrodes 11 in the row direction and a space g2 between two adjacent pixel electrodes 11 in the column direction are each 5 μm, widths of the pixel electrode 11 along the row direction and the column direction are each 355 μm. Therefore, 20 signal wiring lines 12 are arranged for a pixel column with a width of 355 μm, and each pixel electrode 11 in the first display region R1 is connected to one of the 20 signal wiring lines 12 located in a lower layer in a contact hole CH.

Similar to the first auxiliary electrode 16 of the liquid crystal panel 400 in the fourth embodiment, the first auxiliary electrode 16 has an L shape and overlaps the pixel electrodes 11 of four pixels Px located at an upper right, a lower right, an upper left, and a lower left of the first auxiliary electrode 16. A width w1 of a portion of the first auxiliary electrode 16 parallel to the column direction and a width w2 of a portion of the first auxiliary electrode 16 parallel to the row direction are each 11 μm, and the first auxiliary electrode 16 overlaps the pixel electrodes 11 with a width of 3 μm. A space g3 between two adjacent first auxiliary electrodes 16 in the row direction and a space g4 between two adjacent first auxiliary electrodes 16 in the column direction are each 5 μm.

In the first display region R1, each first auxiliary electrode 16 is electrically connected to the upper right pixel electrode 11 and has the same potential as the upper right pixel electrode 11. In the second display region R2, each first auxiliary electrode 16 is electrically connected to at least the upper right pixel electrode 11 and has the same potential as the upper right pixel electrode 11. With such a configuration, similar to the liquid crystal panel 400 in the fourth embodiment, formation of dark lines (or bright lines) is suppressed. Each first auxiliary electrode 16 in the second display region R2 can be used to electrically connect the upper right pixel electrode 11 to the lower right, upper left, and/or lower left pixel electrode 11.

Regions A surrounded by dotted lines in FIG. 15D are regions that overlap neither the pixel electrode 11 (the first conductive layer M1) nor the first auxiliary electrode 16 (the second conductive layer M2) when viewed from a normal direction of a substrate plane of a first substrate 10.

The second auxiliary electrode 17 is located so as to overlap the regions A, as illustrated in FIG. 15E. A width w3 in the row direction and a width w4 in the column direction of the second auxiliary electrode 17 are each 17 μm.

Similar to the second auxiliary electrode 17 of the liquid crystal panel 400 in the fourth embodiment, the second auxiliary electrode 17 overlaps pixel electrodes 11 of the four pixels Px located at an upper right, a lower right, an upper left, and a lower left of the second auxiliary electrode 17.

In the first display region R1, each second auxiliary electrode 17 is electrically connected to the upper left pixel electrode 11 and has the same potential as the upper left pixel electrode 11. In the second display region R2, each second auxiliary electrode 17 is electrically connected to at least the upper left pixel electrode 11 and has the same potential as the upper left pixel electrode 11. With such a configuration, similar to the liquid crystal panel 400 in the fourth embodiment, an effect of suppressing formation of dark lines (or bright lines) can be enhanced. Each second auxiliary electrode 17 in the second display region R2 can be used to electrically connect the upper left pixel electrode 11 to the upper right, lower right, and/or lower left pixel electrode 11.

A width w5 of each signal wiring line 12 is 11.9 μm, and a space g5 between two adjacent signal wiring lines 12 is 5 μm. A space g6 between each second auxiliary electrode 17 and the adjacent signal wiring line 12 is also 5 μm.

Note that, here, a configuration is exemplified in which all the pixel electrodes 11 in the second display region R2 are electrically connected to each other and are not connected to the pixel drive circuit 50, and the same potential as the counter electrode 21 is always applied (thus, each pixel Px in the second display region R2 is always in a transmitting state). However, all the pixel electrodes 11 in the second display region R2 may be electrically connected to each other and be connected to at least one pixel drive circuit 50. In this case, although a power reduction effect is not obtained, it is possible to switch on and off (reflective display and transmissive display) states of the second display region R2.

Display Device

Figure 16A:
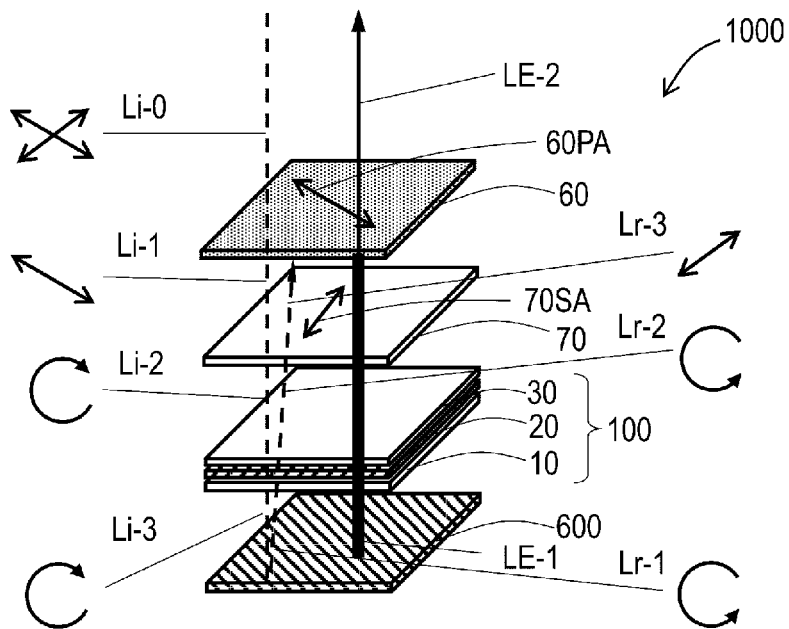
FIG. 16A is an exploded perspective view schematically illustrating a display device 1000 including the liquid crystal panel 100, illustrating the display device 1000 in an off state.
Figure 16B:
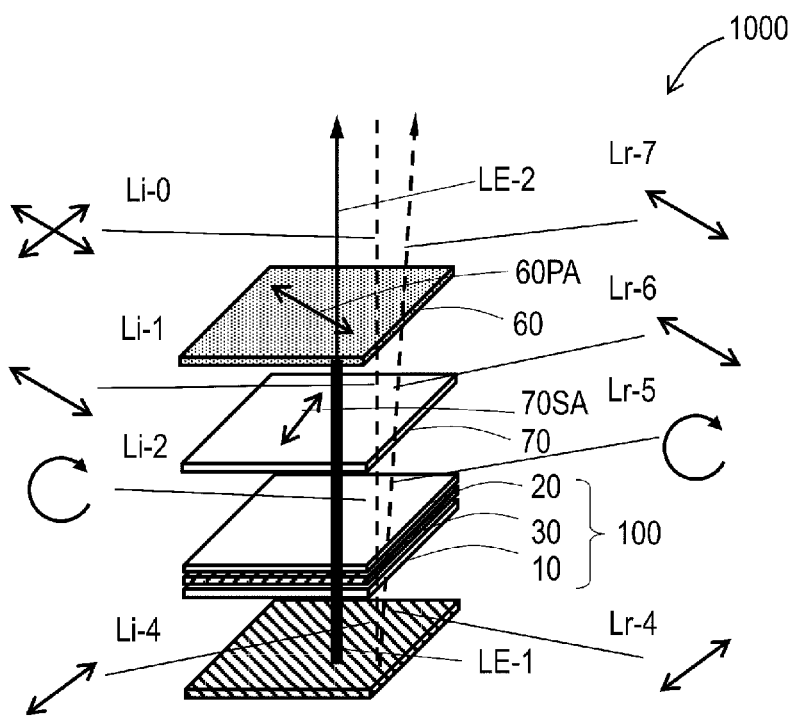
FIG. 16B is an exploded perspective view schematically illustrating the display device 1000, illustrating the display device 1000 in an on state.

The liquid crystal panels according to the embodiments in the disclosure can be suitably used, for example, as a liquid crystal element layer of the display device disclosed in JP 2022-014177 already described. A display device 1000 including the liquid crystal panel according to the embodiment of the disclosure will be described with reference to FIGS. 16A and 16B. FIGS. 16A and 16B are exploded perspective views schematically illustrating the display device 1000. Hereinafter, when the liquid crystal panel is in an on state, it is also referred to as an on state of the display device 1000, and when the liquid crystal panel is in an off state, it is also referred to as an off state of the display device 1000. FIG. 16A illustrates the display device 1000 in an off state, and FIG. 16B illustrates the display device 1000 in an on state. In FIGS. 16A and 16B, polarization states of light (unpolarized light, linearly polarized light, circularly polarized light) are indicated by arrows. A transmission axis of a polarizer and a slow axis of a retarder are also indicated by arrows.

As illustrated in FIGS. 16A and 16B, the display device 1000 includes a liquid crystal panel (liquid crystal element layer) 100, a display panel 600 located on a back face side with respect to the liquid crystal panel 100, and a polarizer 60 located on a viewer's side (front side) with respect to the liquid crystal panel 100. The liquid crystal panel 100 is configured to cause a retardation of approximately a quarter wavelength in light that passes through a liquid crystal layer 30 by applying a voltage to the liquid crystal layer 30. Note that "retardation" as used herein refers to retardation for light having a wavelength around 550 nm, which has high visibility in visible light. The retardation of approximately a quarter wavelength refers to a retardation of 138 nm±20 nm, for example, but this may vary depending on required display quality. As a display mode, VA mode is preferable from the viewpoint of contrast ratio, but various modes such as lateral electrical field mode and TN mode can be used. Here, the display panel 600 is an organic EL display panel including an organic EL element layer.

In the illustrated example, the display device 1000 further includes a retarder 70 located between the liquid crystal panel 100 and the polarizer 60. However, the retarder 70 may be omitted depending on the display mode.

The liquid crystal panel 100 and the polarizer 60 are configured to perform reflective display using light reflected in the display panel 600, and to perform self-luminous display using light emitted from the display panel 600. The liquid crystal panel 100 does not include a reflective layer and does not function as a reflective liquid crystal display element even when simply combined with the polarizer 60. In addition, since the display device 1000 does not include a polarizer between the liquid crystal panel 100 and the display panel 600, the liquid crystal panel 100 cannot constitute a transmissive liquid crystal display element.

The display device 1000 includes only the polarizer 60 located on the viewer's side with respect to the liquid crystal panel 100 as a polarizer and does not include a polarizer between the liquid crystal panel 100 and the display panel 600. This increases light usage efficiency of the self-luminous display and the reflective display is improved, as described in JP 2022-014177.

The liquid crystal panel 100 preferably does not include a black matrix, and preferably does not include a color filter layer. The liquid crystal panel 100 without a black matrix increases alignment flexibility and improves the light usage efficiency. In addition, the liquid crystal panel 100 without a color filter layer increases the alignment flexibility and improves the light usage efficiency.

Operation of the display device 1000 in an off state (here, a state in which no voltage is applied to the liquid crystal layer 30 and no retardation is given to light that passes through the liquid crystal layer 30) will be described with reference to FIG. 16A.

Unpolarized external light Li-0 that has passed through the polarizer 60 becomes linearly polarized light Li-1 parallel to a transmission axis 60PA of the polarizer 60. The retarder 70 has a slow axis 70SA inclined with respect to the transmission axis 60PA, and the linearly polarized light Li-1 that has passed through the retarder 70 becomes, for example, right-handed circularly polarized light Li-2. After passing through the liquid crystal panel 100 in the off state, the polarization state of the right-handed circularly polarized light Li-2 is maintained, and right-handed circularly polarized light Li-3 enters the display panel 600 as it is. The right-handed circularly polarized light Li-3 is reflected in the display panel 600 and becomes left-handed circularly polarized light Lr-1. After passing through the liquid crystal panel 100, the polarization state of the left-handed circularly polarized light Lr-1 is maintained, and left-handed circularly polarized light Lr-2 enters the retarder 70 as it is. The left-handed circularly polarized light Lr-2 that has passed through the retarder 70 becomes linearly polarized light Lr-3. A polarization direction of the linearly polarized light Lr-3 is orthogonal to the linearly polarized light Li-1 and is orthogonal to the transmission axis 60PA of the polarizer 60, so the linearly polarized light Lr-3 is absorbed by the polarizer 60. That is, the display device 1000 in the off state displays black in the reflective display.

Operation of the display device 1000 in an on state (here, a state in which a voltage is applied to the liquid crystal layer 30 and a retardation of approximately a quarter wavelength is generated in light that passes through the liquid crystal layer 30) will be described with reference to FIG. 16B.

The right-handed circularly polarized light Li-2 that has passed through the liquid crystal panel 100 in the on state becomes linearly polarized light Li-4. A polarization direction of the linearly polarized light Li-4 is a direction orthogonal to the linearly polarized light Li-1. The linearly polarized light Li-4 enters the display panel 600, reflected in the display panel 600, and becomes linearly polarized light Lr-4. A polarization direction of the linearly polarized light Lr-4 is the same as that of the linearly polarized light Li-4. The linearly polarized light Lr-4 passes through the liquid crystal panel 100 in the on state, becomes right-handed circularly polarized light Lr-5, and enters the retarder 70. The right-handed circularly polarized light Lr-5 that has entered the retarder 70 passes through the retarder 70 and becomes linearly polarized light Lr-6. A polarization direction of the linearly polarized light Lr-6 is the same as that of the linearly polarized light Li-1, and the linearly polarized light Lr-6 passes through the polarizer 60.

For example, when a transmittance of the polarizer 60 is 42%, a transmittance of the retarder 70 is 100%, a transmittance of the liquid crystal panel 100 is 85%, and a reflectance of the display panel 600 is 90%, reflected light Lr-7 emitted from the polarizer 60 is about 27% of the external light Li-0. Reflective display using the reflected light Lr-7 is a mirror display when reflection in the display panel 600 is specular reflection. By providing a scattering layer (not illustrated) between the display panel 600 and the liquid crystal panel 100, the reflective display can be changed to a white display. Note that depending on a degree of scattering, the reflective display can also be changed to an intermediate display between the mirror display and the white display (i.e., a silver-colored display). When a scattering layer that has polarization dependence and in which an azimuthal direction of strong scattering forms an angle within ±5° with the transmission axis 60PA of the polarizer 60 is used as the scattering layer, contrast ratio can be increased more than when using a typical scattering layer that scatters light isotropically.

As the scattering layer, a phase-separated scattering layer (e.g., phase-separated AG film manufactured by DAICEL CORPORATION) that does not have uneven structure can be suitably used. Further, as the scattering layer having polarization dependence, for example, a polarized light scattering film (JP 5468766 B) manufactured by DuPont Teijin Films can be suitably used.

Light LE-1 emitted from the display panel 600 is unpolarized light and is partially absorbed by the polarizer 60 regardless of whether the liquid crystal panel 100 is in the on state or the off state. For example, when a transmittance of the polarizer 60 is 42%, light LE-2 used for self-luminous display is 42% of the light LE-1.

Note that the display panel 600 can be switched on/off in each of the on state and the off state in the above description.

Figure 17A:
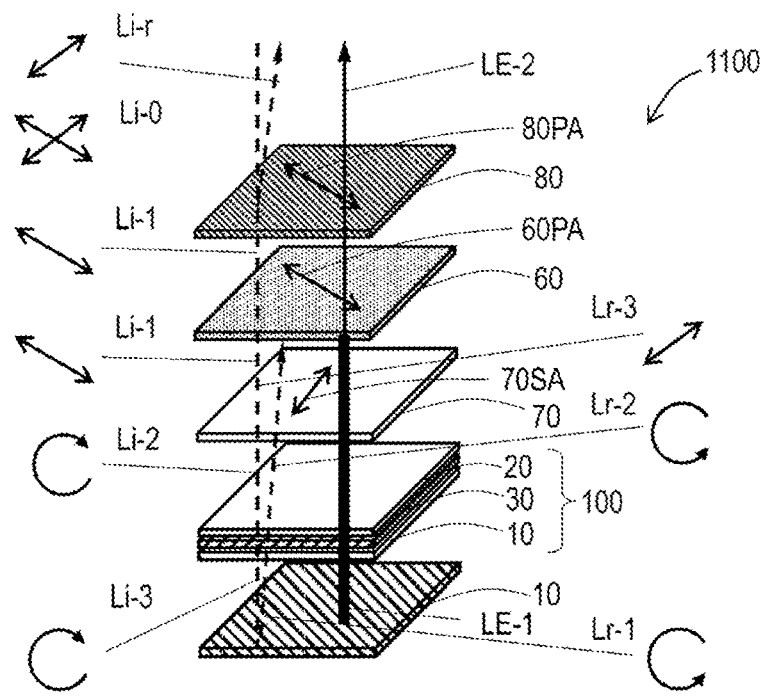
FIG. 17A is an exploded perspective view schematically illustrating another display device 1100 including the liquid crystal panel 100, illustrating the display device 1100 in an off state.
Figure 17B:
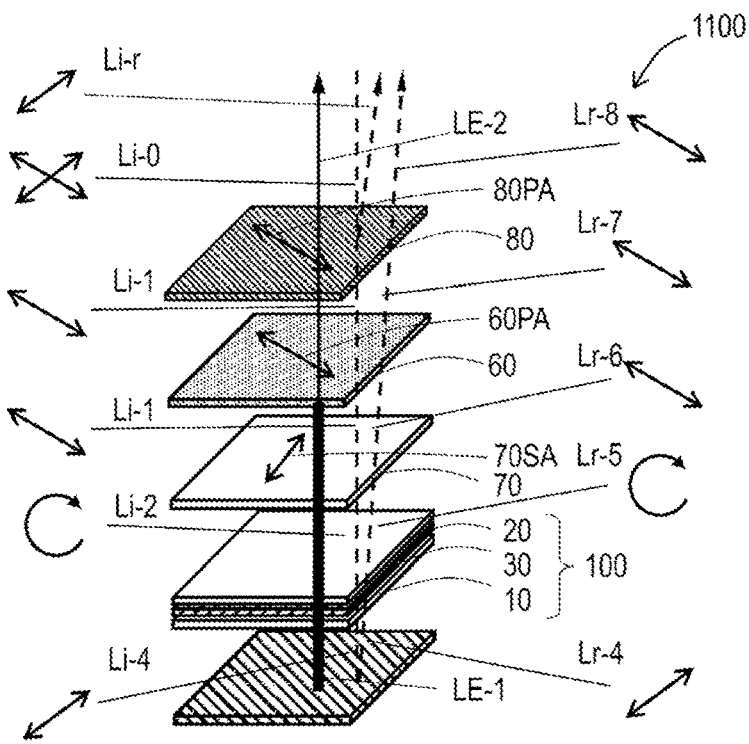
FIG. 17B is an exploded perspective view schematically illustrating the display device 1100, illustrating the display device 1100 in an on state.

Next, another display device 1100 including the liquid crystal panel 100 will be described with reference to FIGS. 17A and 17B. FIGS. 17A and 17B are exploded perspective views schematically illustrating the display device 1100. FIG. 17A illustrates the display device 1100 in an off state and FIG. 17B illustrates the display device 1100 in an on state.

As illustrated in FIGS. 17A and 17B, the display device 1100 differs from the display device 1000 illustrated in FIGS. 16A and 16B in that the display device 1100 further includes a reflective polarizer 80 located on the viewer's side with respect to the polarizer 60.

The reflective polarizer 80 transmits linearly polarized light parallel to a transmission axis 80PA and reflects linearly polarized light in a polarization direction orthogonal to the transmission axis 80PA. When a linearly polarized light reflectance of the reflective polarizer 80 is 45%, in the off state illustrated in FIG. 17A, reflective display of the display device 1100 uses reflected light Li-r that is 45% of the external light Li-0. Further, in the on state illustrated in FIG. 17B, the reflective display of the display device 1100 can use reflected light that is 72% of the external light Li-0.

Therefore, the display device 1100 can provide brighter display than the display device 1000. However, from the viewpoint of contrast ratio, the display device 1000 is superior.

Note that a scattering layer may be provided instead of the reflective polarizer 80. By providing the scattering layer, a white or silver reflective display can be performed in the on state.

Alternatively, a scattering layer may be located on the viewer's side with respect to the reflective polarizer 80. By providing the reflective polarizer 80, bright reflective display can be achieved in both the on state and the off state than when only the scattering layer is provided.

Note that here, the examples have been described in which the display devices 1000 and 1100 include the liquid crystal panel 100 in the first embodiment, but the display devices 1000 and 1100 may include the liquid crystal panel 200, 300, or 400 in the second, third, or fourth embodiment as the liquid crystal element layer.

Figure 18:
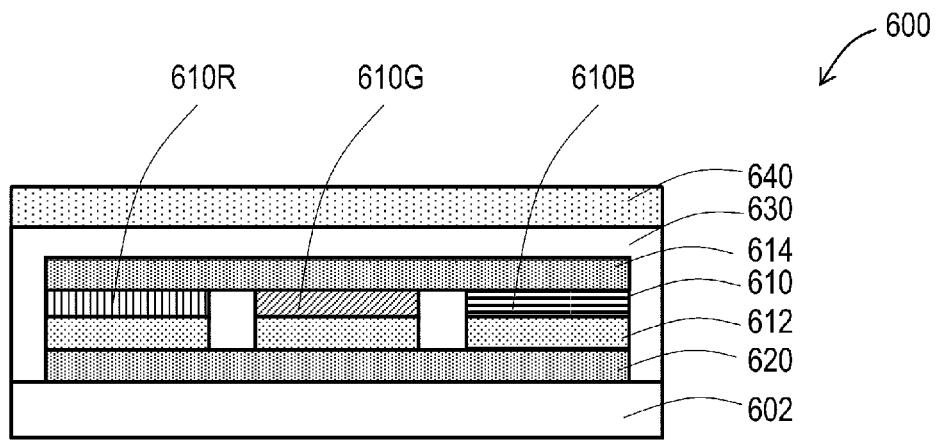
FIG. 18 is a cross-sectional view schematically illustrating an organic EL display panel 600.

Next, an example of the organic EL display panel (display panel) 600 will be described with reference to FIG. 18. FIG. 18 is a cross-sectional view schematically illustrating the organic EL display panel 600. As the organic EL display panel 600, various known organic EL display panels can be used, but it is preferable to use an organic EL display panel that does not include a color filter layer and in which each organic EL element can emit primary color light.

In the example illustrated in FIG. 18, the organic EL display panel 600 includes a substrate 602, a backplane 620 formed on the substrate 602, an anode electrode 612 formed on the backplane 620, an organic EL layer 610 formed on the anode electrode 612, and a cathode electrode 614 formed on the organic EL layer 610. The organic EL layer 610 includes an organic EL layer 610R that emits red light, an organic EL layer 610G that emits green light, and an organic EL layer 610B that emits blue light. Here, the reference signs 610R, 610G, and 610B indicating the organic EL layers are also used as reference signs of organic EL elements (primary color pixels) that emit the respective colored lights (primary colors). That is, the organic EL display panel 600 includes an organic EL element 610R that emits red light, an organic EL element 610G that emits green light, and an organic EL element 610B that emits blue light. One pixel of the organic EL display panel 600 capable of color display (hereinafter simply referred to as a "pixel" and distinguished from the "primary color pixel") includes the organic EL element 610R that emits red light, the organic EL element 610G that emits green light, and the organic EL element 610B that emits blue light. The combination of primary color pixels included in the pixels of the organic EL display panel 600 is not limited thereto.

As illustrated in FIG. 18, the anode electrode 612 is provided for each organic EL element (primary color pixel). The anode electrode 612 is, for example, a metal layer (e.g., a layered structure of silver/ITO with a thickness of 150 nm), and a reflectance of the anode electrode 612 is, for example, about 95%. The cathode electrode 614 is one metal layer (e.g., a silver layer with a thickness of 10 nm) provided in common to multiple organic EL elements (primary color pixels) (e.g., in common to all the organic EL elements (primary color pixels)), and a reflectance of the cathode electrode 614 is, for example, about 50%. The organic EL display panel 600 may have a reflectance of, for example, about 90% as a whole.

A thin film encapsulation structure 630 is formed so as to entirely cover the organic EL elements 610R, 610G, and 610B and the backplane 620. A scattering layer 640 described above is provided on the thin film encapsulation structure 630. As is well known, the thin film encapsulation structure 630 has a layered structure of an organic insulating layer and an inorganic insulating layer. Note that as the substrate 602, a known transparent substrate (e.g., a glass substrate or a polyimide substrate) can be used.

Figure 19:
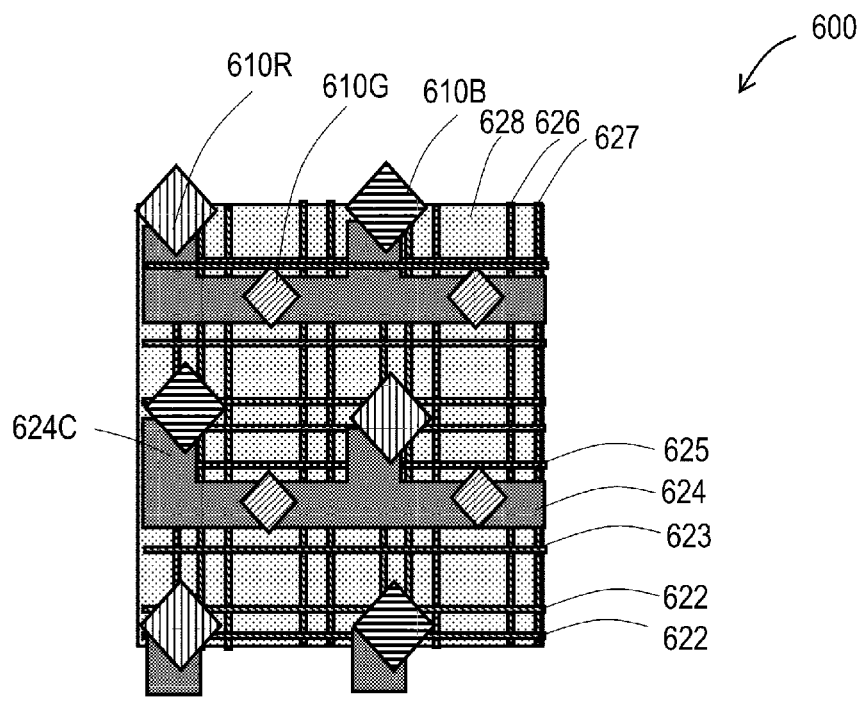
FIG. 19 is a top view schematically illustrating the organic EL display panel 600.

FIG. 19 is a top view schematically illustrating the organic EL display panel 600. FIG. 19 schematically illustrates a configuration of a wiring line layer located at a top layer of the backplane 620, including wiring lines connected to the organic EL elements 610R, 610G, and 610B.

The wiring line layer includes power supply lines 622, scan lines 623, emission lines 625, and EL power supply lines 626 and 627 (VDD and VSS). Further, the wiring line layer includes a light blocking pattern 624 for protecting thin film transistors (TFTs, not illustrated), and protruding portions 624C of the light blocking pattern 624 also serve as electrodes of capacitors.

Compared to the pixels of the organic EL display panel 600 that provides high-resolution display, the liquid crystal panel 100 provides a coarse display, so the pixels of the liquid crystal panel 100 are larger than the pixels of the organic EL display panel 600. That is, pieces of light emitted from two or more pixels of the organic EL display panel 600 pass through one pixel Px of the liquid crystal panel 100. For example, pieces of light emitted from 10 or more, or 30 or more pixels of the organic EL display panel 600 pass through one pixel Px of the liquid crystal panel 100.

As can be seen from FIG. 19, in the organic EL display panel 600, there are many areas in which the organic EL elements 610R, 610G, and 610B and the wiring lines and the like 622, 623, 624, 625, 626, and 627 are not formed. Even when the cathode electrode 614 (not illustrated in FIG. 19) is formed over an entire surface, a reflectance is about 50%. By forming a dummy wiring line layer 628 with a metal layer having a reflectance of about 95%, the organic EL display panel 600 as a whole can have a reflectance of, for example, about 90%. The dummy wiring line layer 628 can be formed using, for example, the same metal material as the anode electrode 612.

INDUSTRIAL APPLICABILITY

The liquid crystal panels according to the embodiments of the disclosure can achieve higher transmittance than known liquid crystal panels and are suitably used as an electro-optical panel located on a viewer's side in a layered display device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal panel comprising:
a first substrate;
a second substrate facing the first substrate; and
a liquid crystal layer located between the first substrate and the second substrate,
wherein the liquid crystal panel includes an active region including a plurality of pixels arranged in a matrix and a frame region located around the active region,
the first substrate includes a plurality of pixel electrodes, each located in each of the plurality of pixels, and a plurality of signal wiring lines, each extending from the frame region to the active region,
in a plan view, the active region includes:
a first display region defined by a first group of pixels included in the plurality of pixels, and
a second display region defined by a second group of pixels included in the plurality of pixels,
among the plurality of pixel electrodes:
a plurality of first pixel electrodes located in the first display region is electrically independent on a pixel-by-pixel basis, and
a plurality of second pixel electrodes located in the second display region includes at least one pixel electrode set including two or more pixel electrodes electrically connected to each other, and
the plurality of first pixel electrodes and the plurality of second pixel electrodes are provided to the first substrate.

2. The liquid crystal panel according to claim 1,
wherein the plurality of pixel electrodes has substantially the same shape.

3. The liquid crystal panel according to claim 1,
wherein the first substrate further includes a first conductive layer including the plurality of pixel electrodes, a second conductive layer including portions of the plurality of signal wiring lines located in the active region, and a first insulating layer provided between the first conductive layer and the second conductive layer.

4. The liquid crystal panel according to claim 3,
wherein a particular pixel electrode set of the at least one pixel electrode set includes two or more pixel electrodes connected to a particular signal wiring line of the plurality of signal wiring lines in contact holes independently formed in the first insulating layer.

5. The liquid crystal panel according to claim 3,
wherein the first substrate further includes a first connection electrode configured to overlap two or more pixel electrodes adjacent to each other as viewed from a normal direction of a substrate plane of the first substrate, and a particular pixel electrode set of the at least one pixel electrode set includes the two or more pixel electrodes electrically connected to each other via the first connection electrode.

6. The liquid crystal panel according to claim 5,
wherein the first connection electrode is included in the second conductive layer, and
the two or more pixel electrodes electrically connected to each other via the first connection electrode are connected to the first connection electrode in contact holes independently formed in the first insulating layer.

7. The liquid crystal panel according to claim 5,
wherein the first connection electrode overlaps four pixel electrodes arranged in two rows and two columns as viewed from the normal direction of the substrate plane of the first substrate.

8. A liquid crystal panel comprising:
a first substrate;
a second substrate facing the first substrate; and
a liquid crystal layer located between the first substrate and the second substrate,
wherein the liquid crystal panel includes an active region including a plurality of pixels arranged in a matrix and a frame region located around the active region,
the first substrate includes a plurality of pixel electrodes, each located in each of the plurality of pixels, and a plurality of signal wiring lines, each extending from the frame region to the active region,
the liquid crystal panel further comprises a plurality of pixel drive circuits located outside the active region,
the plurality of pixel electrodes and portions of the plurality of signal wiring lines located in the active region are made of a transparent conductive material,
the active region includes a display region defined by at least some of the plurality of pixels,
of the plurality of pixel electrodes, pixel electrodes located in the display region include at least one pixel electrode set including two or more pixel electrodes electrically connected to each other,
the first substrate further includes a first conductive layer including the plurality of pixel electrodes, a second conductive layer including the portions of the plurality of signal wiring lines located in the active region, and a first insulating layer provided between the first conductive layer and the second conductive layer,
the first substrate further includes a third conductive layer provided on a side opposite the first conductive layer with respect to the second conductive layer, and a second insulating layer provided between the third conductive layer and the second conductive layer, or the first substrate further includes the third conductive layer provided between the first conductive layer and the second conductive layer, and the second insulating layer provided between the third conductive layer and the first conductive layer,
the third conductive layer includes a second connection electrode configured to overlap two or more pixel electrodes as viewed from a normal direction of a substrate plane of the first substrate, and
a particular pixel electrode set of the at least one pixel electrode set includes the two or more pixel electrodes electrically connected to each other via the second connection electrode.

9. The liquid crystal panel according to claim 3,
wherein the first substrate further includes a third connection electrode formed in the frame region extending in a direction that intersects a direction in which the plurality of signal wiring lines extends, and that overlaps two or more signal wiring lines of the plurality of signal wiring lines as viewed from a normal direction of a substrate plane of the first substrate, and
a particular pixel electrode set of the at least one pixel electrode set includes the two or more pixel electrodes electrically connected to each other via the third connection electrode.

10. The liquid crystal panel according to claim 9,
wherein the third connection electrode is included in the first conductive layer, and
at least two signal wiring lines of the two or more signal wiring lines overlapping the third connection electrode are connected to the third connection electrode in contact holes independently formed in the first insulating layer.

11. The liquid crystal panel according to claim 1,
wherein the first substrate further includes a first auxiliary electrode configured to fill a space between two pixels adjacent to each other as viewed from a normal direction of a substrate plane of the first substrate, and
the first auxiliary electrode is made of a transparent conductive material and is electrically connected to at least one of two pixel electrodes located in the two pixels.

12. The liquid crystal panel according to claim 11,
wherein a particular pixel electrode set of the at least one pixel electrode set includes the two or more pixel electrodes electrically connected to each other via the first auxiliary electrode.

13. The liquid crystal panel according to claim 12,
wherein the first substrate further includes a first conductive layer including the plurality of pixel electrodes, a second conductive layer including the first auxiliary electrode, and a first insulating layer provided between the first conductive layer and the second conductive layer, and
the two or more pixel electrodes electrically connected to each other via the first auxiliary electrode are connected to the first auxiliary electrode in contact holes independently formed in the first insulating layer.

14. The liquid crystal panel according to claim 13,
wherein the first substrate further includes a third conductive layer provided on a side opposite the first conductive layer with respect to the second conductive layer, and a second insulating layer provided between the third conductive layer and the second conductive layer, and
the third conductive layer includes portions of the plurality of signal wiring lines located in the active region.

15. The liquid crystal panel according to claim 14,
wherein another particular pixel electrode set of the at least one pixel electrode set includes two or more pixel electrodes connected to a particular signal wiring line of the plurality of signal wiring lines in another contact holes independently formed in a layered body of the first insulating layer and the second insulating layer.

16. The liquid crystal panel according to claim 14,
wherein the third conductive layer further includes a second auxiliary electrode configured to fill a space between another two pixels adjacent to each other as viewed from the normal direction of the substrate plane of the first substrate, and the second auxiliary electrode is electrically connected to one of two pixel electrodes located in the other two pixels, and has a portion not overlapping the first auxiliary electrode as viewed from the normal direction of the substrate plane of the first substrate.

17. The liquid crystal panel according to claim 8, wherein the second insulating layer includes dummy contact holes formed in regions separately overlapping the plurality of pixel electrodes.

18. The liquid crystal panel according to claim 8, wherein the first substrate further includes light blocking layers configured to block light from entering contact holes formed in the second insulating layer.

19. The liquid crystal panel according to claim 1, wherein the plurality of signal wiring lines includes a signal wiring line overlapping two or more pixel electrodes as viewed from a normal direction of a substrate plane of the first substrate.

* * * * *